(12) United States Patent
Rao

(10) Patent No.: US 7,756,831 B1
(45) Date of Patent: Jul. 13, 2010

(54) COOPERATIVE LOCKING BETWEEN MULTIPLE INDEPENDENT OWNERS OF DATA SPACE

(75) Inventor: Mandavilli Navneeth Rao, Mountain View, CA (US)

(73) Assignee: EMC Corporation, Hopkinton, MA (US)

( * ) Notice: Subject to any disclaimer, the term of this patent is extended or adjusted under 35 U.S.C. 154(b) by 879 days.

(21) Appl. No.: 11/540,415

(22) Filed: Sep. 28, 2006

(51) Int. Cl.
*G06F 17/30* (2006.01)

(52) U.S. Cl. .................................. 707/638; 707/704

(58) Field of Classification Search .................. 707/8, 707/203, 638, 704
See application file for complete search history.

(56) References Cited

U.S. PATENT DOCUMENTS

| | | | |
|---|---|---|---|
| 6,061,770 A | 5/2000 | Franklin | |
| 6,125,371 A | 9/2000 | Bohannon et al. | |
| 6,131,148 A | 10/2000 | West et al. | |
| 6,473,775 B1 | 10/2002 | Kusters et al. | |
| 6,507,847 B1 * | 1/2003 | Fleischman | 707/101 |
| 6,564,215 B1 * | 5/2003 | Hsiao et al. | 707/8 |
| 6,643,754 B1 | 11/2003 | Challenger et al. | |
| 6,665,815 B1 | 12/2003 | Goldstein et al. | |
| 6,675,257 B1 | 1/2004 | Khalid et al. | |
| 6,704,755 B2 * | 3/2004 | Midgley et al. | 707/204 |
| 6,757,802 B2 | 6/2004 | Trainin et al. | |
| 6,789,161 B1 | 9/2004 | Blendermann et al. | |
| 6,804,690 B1 | 10/2004 | Dysert et al. | |
| 6,877,109 B2 | 4/2005 | Delaney et al. | |
| 6,895,486 B2 | 5/2005 | Wong et al. | |
| 6,950,833 B2 * | 9/2005 | Costello et al. | 707/201 |
| 6,959,313 B2 | 10/2005 | Kapoor et al. | |
| 6,959,373 B2 | 10/2005 | Testardi | |
| 7,155,465 B2 | 12/2006 | Lee et al. | |
| 7,266,574 B1 | 9/2007 | Boudrie et al. | |
| 7,296,125 B2 | 11/2007 | Ohran | |
| 7,334,095 B1 | 2/2008 | Fair et al. | |
| 7,350,043 B2 | 3/2008 | Andre et al. | |
| 7,376,674 B2 | 5/2008 | Lastovica, Jr. | |
| 7,676,514 B2 | 3/2010 | Faibish et al. | |
| 2002/0029227 A1 * | 3/2002 | Multer et al. | 707/203 |
| 2002/0087950 A1 | 7/2002 | Brodeur et al. | |
| 2002/0138544 A1 * | 9/2002 | Long | 709/107 |
| 2003/0028740 A1 | 2/2003 | Challenger et al. | |

(Continued)

OTHER PUBLICATIONS

Folk et al., *File Structures*, second edition; by 1992, pp. 190-203.

(Continued)

*Primary Examiner*—Don Wong
*Assistant Examiner*—Kim T Nguyen
(74) *Attorney, Agent, or Firm*—Van Pelt, Yi & James LLP

(57) ABSTRACT

Locking allocated data space is disclosed. An indication is received that certain previous version data is required to be retained. A map of metadata records, each associated with a journaling process write of previous version data which write includes previous version data required to be retained, is built. In some embodiments, the map associates a write time with each record in the map. A reclamation process checks to determine whether any storage proposed to be reclaimed is included in the map of record identifiers. In some embodiments, the determination is made based at least in part on the write time associated in the map with at least a first record identifier in time-sorted order.

20 Claims, 28 Drawing Sheets

U.S. PATENT DOCUMENTS

| | | |
|---|---|---|
| 2003/0074378 A1 | 4/2003 | Midgley et al. |
| 2003/0097360 A1* | 5/2003 | McGuire et al. ............... 707/8 |
| 2003/0097611 A1 | 5/2003 | Delaney et al. |
| 2003/0182301 A1 | 9/2003 | Patterson et al. |
| 2003/0229826 A1 | 12/2003 | Lee et al. |
| 2004/0049507 A1* | 3/2004 | Cole ............................. 707/8 |
| 2004/0059878 A1 | 3/2004 | Madany |
| 2004/0068501 A1* | 4/2004 | McGoveran ................... 707/8 |
| 2004/0163009 A1 | 8/2004 | Goldstein et al. |
| 2004/0220931 A1* | 11/2004 | Guthridge et al. .............. 707/8 |
| 2004/0236718 A1 | 11/2004 | Primm |
| 2004/0267745 A1* | 12/2004 | HoogerBrugge et al. ....... 707/8 |
| 2004/0268067 A1 | 12/2004 | Yamagami |
| 2005/0055526 A1 | 3/2005 | Challenger et al. |
| 2005/0131961 A1 | 6/2005 | Margolus et al. |
| 2005/0149525 A1* | 7/2005 | Verma et al. ................... 707/8 |
| 2005/0171979 A1 | 8/2005 | Stager et al. |
| 2005/0216788 A1 | 9/2005 | Mani-Meitav et al. |
| 2005/0223004 A1* | 10/2005 | McKenney et al. ............ 707/8 |
| 2006/0129778 A1 | 6/2006 | Clark et al. |
| 2006/0294059 A1 | 12/2006 | Chamberlain et al. |
| 2007/0220311 A1 | 9/2007 | Lewin et al. |
| 2007/0294274 A1 | 12/2007 | Kano |

OTHER PUBLICATIONS

Dominic Giampaolo, *Practical File System Design with the Be File System*, Morgan Kaufman, 1999.

Rosenblum et al., *The Design and Implementation of a Log Structured File System*, ACM Transactions on Computer Systems, vol. 10, No. 1, Feb. 1992, pp. 26-52.

Doug Doucette, *xFS Space Manager Design*, Silicon Graphics Inc., Oct. 7, 1993.

Microsoft Press Dictionary 5th edition, pp. 269-270. Copyright 2002.

\* cited by examiner

COOPERATIVE LOCKING BETWEEN MULTIPLE INDEPENDENT OWNERS OF DATA SPACE

BACKGROUND OF THE INVENTION

Continuous data protection enables a user to be able to access or restore a previous state with finer time granularity than previously offered by some traditional backup solutions. For example, some traditional backup solutions perform backups at discrete points in time that are separated by hours or even days. The only previous states that a user is able to restore are the states corresponding to those points in time. With continuous data protection, data (e.g., a file or other data associated with a continuously protected device) is continuously protected over a window of time and a user is able to access almost any prior state within that window. For example, using some continuous data protection systems a user can access or restore saved states that are seconds or fraction of seconds apart.

To continuously protect data, previous version data is obtained and stored. Typically, storage used to store previous version data is reclaimed as the data stored in particular locations is no longer required to be retained, e.g., because it relates to states that fall outside (i.e., prior to the earliest/ beginning edge of) the rolling window described above. However, in some cases previous version data that falls outside the continuous data protection window may need to be retained, e.g., because a user has indicated the data is desired to be available to be used to restore a data set or one or more data objects comprising the set. In some cases, storage locations that would otherwise be eligible for reclamation and reuse contain previous version data still required by two or more independent owners, e.g., previous version data associated with data blocks that were not changed between a time t1 associated with a first mounted restore point and a later time t2 associated with a second mounted restore point. Therefore, there is a need for a way to prevent efficiently reclamation and reuse of storage locations in which previous version data that has fallen outside the continuous data protection window but which still is required by two or more independent owners is stored.

BRIEF DESCRIPTION OF THE DRAWINGS

Various embodiments of the invention are disclosed in the following detailed description and the accompanying drawings.

DETAILED DESCRIPTION

Figure 1:
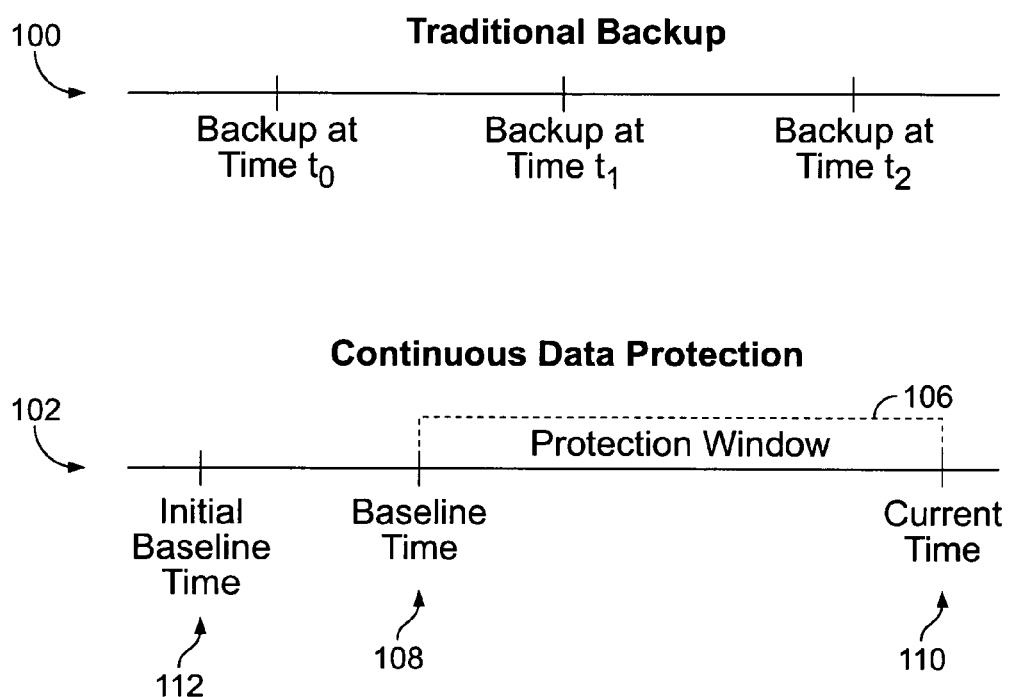
FIG. 1 illustrates an embodiment of timelines associated with continuous data protection and with traditional backup, respectively.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Locking allocated data space is disclosed. An indication is received that certain previous version data is required to be retained. A map of metadata records, each associated with a journaling process write of previous version data which write includes previous version data required to be retained, is built. In some embodiments, the map associates a write time with each record in the map. A reclamation process checks to determine whether any storage proposed to be reclaimed is included in the map of record identifiers. In some embodiments, the determination is made based at least in part on the write time associated in the map with at least a first record identifier in time-sorted order. Storage locations in which previous version data required to be retained beyond a protection window are stored effectively are locked by including associated metadata records in a map or list of metadata records of writes that are required to be retained, without requiring a lock flag, reference count, or other traditional locking mechanism to be associated with either the storage locations in which the previous version data is stored (data space) or the metadata records. In some embodiments, a separate metadata record map is built for each set of previous version data required to be retained beyond a protection window, e.g., two restore points with overlapping records associated with writes to blocks that did not change between a first time t1 associated with a first mount point and a second time t2 associated with a second mount point. Records in any map are considered by reclamation processes to be locked. An indication that a particular set of previous version data retained beyond a protection window is no longer required results in some embodiments in previously "locked" storage locations associated with only that set (and not also some other set) being reclaimed and the metadata record map for that set being deleted. In some embodiments, write times associated in the respective metadata record maps with at least a first and last write in the map, in time-sorted order, are used to determine, e.g., at un-mount of a restore point, whether the set overlaps with any other set(s) still required to be retained beyond the protection window.

FIG. 1 illustrates an embodiment of timelines associated with continuous data protection and with traditional backup, respectively. In the example shown, timeline 100 is associated with traditional backup and backups are performed at times t0, t1, and t3. Using traditional backup, the only states or versions of a device being protected that are stored (i.e., and thus can subsequently be accessed or restored) are the states associated with backup times t0, t1, and t2. It is impossible using a traditional backup system to restore the state of the system at other times such as some time between t0 and t1 or some time between t1 and t2. In some cases, a traditional backup system is scheduled to perform backups every 12 hours or once a day and the corresponding saved states of the device would be separated by 12 hours or 1 day. This relatively coarse degree of time granularity is undesirable in some applications. For example, a user may create a new document after a particular backup and spend a few hours working on the document. If the user's computer were to fail prior to the next backup it would be impossible to restore the document using traditional backup techniques.

Timeline 102 is associated with continuous data protection. Using continuous data protection, previous states or versions (e.g., of files, settings/configurations, or other data associated with a device being continuous protected) are protected continuously and maintained over a protection window. Some continuous data protection systems are configured to be able to restore the state of a device to Any Point in Time (APIT). This permits, for example, a file or other data to be restored to any point in time. Some continuous data protection systems are configured to be able to restore the state of a device to a Significant Point in Time (SPIT). In various embodiments, a significant point in time is fixed, determined and/or configurable. For example, in some embodiments the significant points in time are defined by the continuous data protection application. In some embodiments, significant points in time are defined by a user. In some embodiments, the amount of time between successive SPIT are defined based on an application or usage scenario. In some applications (e.g., a user modifying a document) 15 seconds of resolution is acceptable. In other applications (e.g., with a faster expected rate of change and/or that have business rules that require a finer resolution), significant points in time with better time resolution are used. For example, it may be desirable to define significant points in time to be every second if the device being protected is a high-traffic web server that processes merchandise and/or payment information for an online retailer. The techniques disclosed herein can be used to restore Any Point in Time (APIT) or Significant Points in Time (SPIT) in various embodiments.

In some embodiments, SPIT refers to or is associated with data that is logically consistent. For example, some CDP systems are configured so that during continuous data protection (CDP) windows, every write on the CDP client is stored on the CDP server. So at every point of time, a snapshot region and a data region (e.g., on a CDP server) form a physically consistent copy. However, in some cases a snapshot region and data region only become logically consistent when the application or server on a CDP client has made sure that all changes in memory or storage are flushed off to the disk (e.g., and are not retained in main memory). In some cases, if there are changes in main memory that have not been flushed to disk (e.g., on the CDP client) then the data region and snapshot region on the CDP server are physically consistent and not logically consistent.

Protection window 106 is a sliding window that extends from baseline time 108 to current time 110. In some embodiments, points in time outside of protection window 106 are no longer available and cannot be restored or access by a user. Typically, there is a finite amount of backup media, e.g., disk space, available to store previous version data. To deal with the finite amount of storage, some older previous version data is deleted (or migrated to offline media, such as tape) to make room for new previous version data as time progresses and/or new data is generated (e.g., as files, configurations, or settings are created, modified, or deleted). In some embodiments, baseline time 108 is the earliest time at which a prior state or version is made available, e.g., to a user, to be restored or accessed. Current time 110 corresponds to the current state of a device and is the most recent time for which the state of a device can be restored. In some cases, two times correspond to the same state or version, for example if there are not changes between those two times. In some embodiments, baseline time 108 and current time 110 advance as time goes on but do not necessarily advance at the same time and/or advancement of one does not necessarily depend upon the other. For example, in some embodiments older stored previous version data is not deleted unless the storage locations in which such older previous version data is stored is needed to store new data (e.g., because of a change in state or version). Therefore, in some embodiments, current time 110 advances while baseline time 108 remains at the same point in time if there are not changes to the state of a device being continuously protected. Alternatively, in some embodiments the size of window 106 may constrict under certain conditions—i.e., baseline time 108 may be advanced faster than and move nearer to current time 110—for example if new data is generated at such a high rate (many changes and/or changes of a large size) that some older data has to be purged earlier than it would otherwise have been purge, to make the space in which it is stored available to store new data.

Initial baseline time 112 is the time at which continuous data protection began (e.g., when a continuous data protection client, agent, or process was started). When continuous data protection begins at initial baseline time 112, the protection window has initial baseline time 112 as the baseline time. In some embodiments, as time progresses, the current time increases while the initial baseline time remains as the baseline time for some time. At some point in time (e.g., after an amount of time corresponding to a configured size of protection window 106 has passed, when storage becomes full, and/or when older previous version data is deleted) the baseline time changes and is no longer the initial baseline time. At the time shown in this example, protection window 106 does not include initial baseline time 112 and thus the state associated with initial baseline time 112 is no longer made available to be restored at the time shown in this example.

In some embodiments, there is a target or desired duration associated with protection window 106. For example, a continuous data protection system guarantees 10 days of continuous data protection. In some embodiments, a desired duration is not necessarily absolutely desired. For example, in some cases a desired duration is supported so long as a device being protected or data on the device is within expected, typical, or nominal conditions. There may be so much previous version data being generated (e.g., because a user is constantly modifying a document or many users are making substantial changes to many documents or other stored objects in a relatively short period of time) that there is not enough storage capacity to store all previous version data for a desired duration.

In some embodiments, a continuous data protection system is configured to store previous version data beyond a desired duration so long as there is sufficient storage capacity to do so. That is, in some embodiments it is possible to restore the state of a device beyond a desired duration under certain circumstances. For example, some continuous data protection systems that attempt to provide 10 days of protection may actually be able to provide 15 days of continuous data protection if there is relatively little change to the state of the device. In some cases it may not be necessary to delete previous state data and protection may be provided beyond a desired duration. In some embodiments, this is an optional or configurable mode that a user is able to specify or otherwise control.

In some embodiments, a continuous data protection system is configured to support adjacent protection windows. In some embodiments, each protection window has a different time granularity and/or desired duration associated with it. For example, a first protection window may provide continuous protection for 10 days. After 10 days, previous state can be accessed or restored at points in time 1 hour apart for the next 5 days. That is, a second protection (adjacent to a first protection window) has capabilities similar to that of a traditional backup system and has a desired duration of 5 days and a time granularity of 1 hour.

Figure 2A:
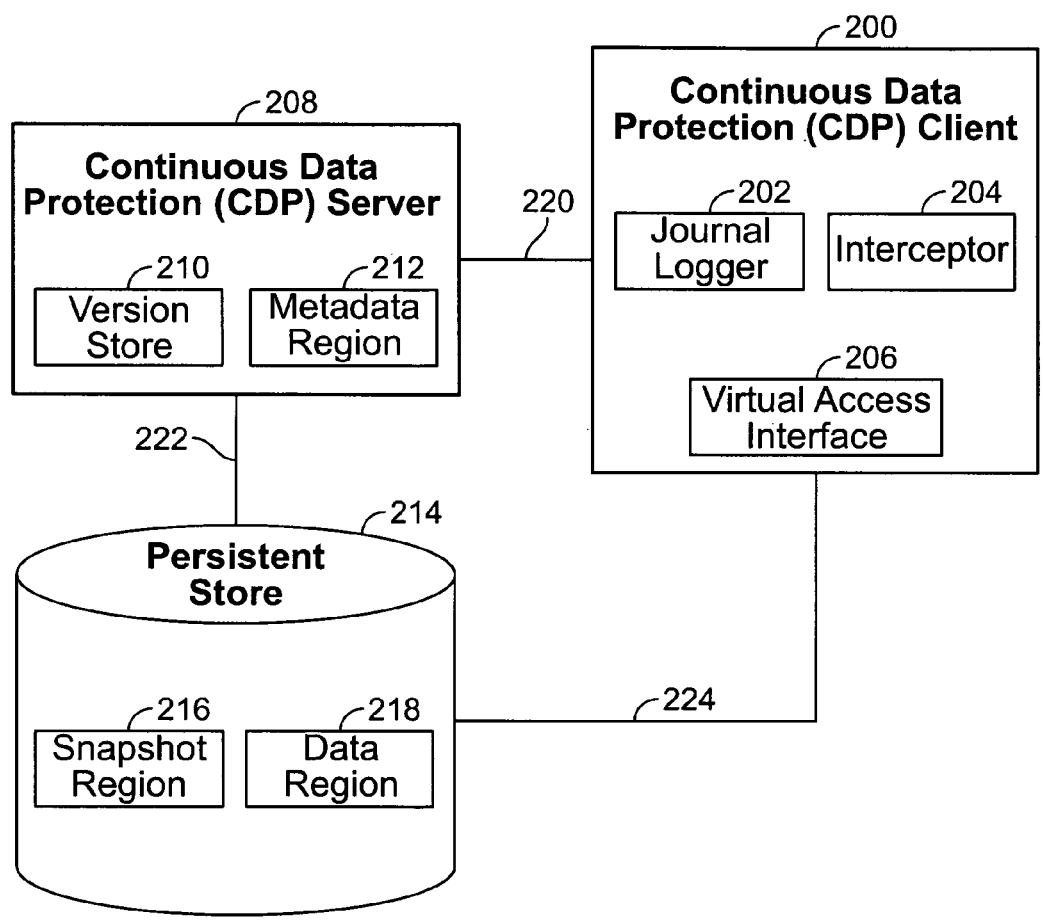
FIG. 2A is a system diagram illustrating an embodiment of a continuous data protection system.

FIG. 2A is a system diagram illustrating an embodiment of a continuous data protection system. In the example shown, continuous data protection (CDP) client 200 is associated with and/or installed and running on a device or host being protected. Examples of a device being protected include a computer, a storage device, a server, a router, etc. In some embodiments, a device being protected comprises multiple physical devices or components. To continuously protect a device, previous version data is generated/obtained and stored. In some embodiments, previous version data is associated with a file or other object stored on CDP client 200, a configuration associated with an application installed on CDP client 200, a setting of CDP client 200, etc.

Journal logger 202, interceptor 204, and virtual access interface 206 are continuous data protection-related processes, clients, or agents running on CDP client 200. In this example, interceptor 204 and journal logger 202 support protection related processes and virtual access interface 206 performs processes relating to restoring or accessing previous states. In some embodiments, CDP client 200 includes multiple physical devices and any number of journal loggers, interceptors, and/or virtual access interfaces can be implemented. For example, in some embodiments, each physical device has its own journal logger, interceptor, and virtual access interface. In some embodiments, each physical device has its own interceptor, and a single journal logger and a single virtual access interface support all physical devices.

Continuous data protection (CDP) server 208 provides protection, access and/or restoration related services, functionality, and/or capabilities to, for example, processes or agents running on CDP client 200. In this example, version store 210 is a process running on CDP server 208 that communicates with journal logger 202 and virtual access interface 206 to provide protection and/or access/restoration related capabilities or operations. For example, in some embodiments, journal logger 202 and version store 210 operate together to store previous version data. In some embodiments, version store 210 includes metadata records to track previous version data that is stored (e.g., where a given piece of previous version data came from, where it is stored, the time it was written, etc.) In some embodiments, version store 210 and virtual access interface 206 are used to provide access to or restoration of a desired previous state.

In some embodiments, there are other CDP clients in addition to CDP client 200 and CDP server 208 supports multiple CDP clients. In some embodiments, each CDP client has its own dedicated CDP server.

Metadata region 212 is used to store metadata associated with managing, accessing, and/or tracking previous version data stored in persistent store 214. In some embodiments, version store 210 manages, updates, and/or controls access to metadata region 212. In the event of a restore or access, information stored in metadata region 212 is used to determine appropriate previous version data to retrieve and/or determine locations on persistent store 214 from which to retrieve such data. In some embodiments, metadata region 212 is stored in cache or on disk (e.g., of CDP server 208). In some embodiments, metadata region 212 (or some copy of it) is stored in persistent store 214, which depending on the embodiment may be associated with the same or a different physical system than CDP server 208.

Persistent store 214 is used to store previous version data associated with CDP client 200 and includes snapshot region 216 and data region 218. In this example, snapshot region 216 is used to store snapshot data (e.g., baseline time 108 in FIG. 1). In some embodiments, snapshot data is prior version data that is associated with the baseline time. In some embodiments, to access or restore the state of CDP client 200 at the baseline time, data is retrieved from snapshot region 216 but not necessarily from data region 218. As the baseline time changes, in some embodiments snapshot data stored in snapshot region 216 is correspondingly updated. Data region 218 is used to store data that has changed after the baseline time and/or does not include snapshot data. For example, if some change to a file or setting occurs after the baseline time, data corresponding to the change is stored in data region 218. To access or restore the state of CDP client 200 to some point in time after the baseline time, data is retrieved from data region 218 and/or snapshot region 216. In some embodiments, the data that is retrieved (e.g., from data region 218 and/or snapshot region 216) depends upon the time being restored/accessed and/or the changes that have occurred between the baseline time and the time of interest.

Persistent store 214 is implemented and/or configured in a variety of ways in various embodiments. In some embodiments, persistent store 214 includes non-volatile storage where data is able to be stored without being erased or corrupted even if persistent store 214 is without power. In various embodiments, various storage media is used by persistent store 214. For example, persistent store 214 can include magnetic tape, optical storage, magnetic disk, etc. In some embodiments, persistent store 214 comprises multiple physical storage devices. For example, some persistent stores include multiple tape storage devices. Some persistent stores include an array of disks. In some embodiments, some network or connection (e.g., a SAN, an Ethernet connection, etc.) is used to connect physical storage devices that comprise a persistent store and/or to enable one or more entities, such as journal logger 202 and/or version store 210, to write to storage locations comprising the persistent store. In some embodiments, a persistent store is used to store data for multiple CDP clients. For example, some continuous protection systems include another CDP client in addition to CDP client 200 and persistent store 214 is used to store previous version data for both CDP clients. In some embodiments, each CDP client has a dedicated persistent store associated with it.

In various embodiments, various networking or communication techniques are used to couple CDP client 200, CDP server, and/or persistent store 214. For example, in some embodiments, connection 220 that connects CDP client 200 and CDP server 208 includes an Internet Protocol (IP) network. In some embodiments, connection 222 connecting CDP server 208 and persistent store 214 includes a Small Computer System Interface (SCSI) connection. In some embodiments, connection 224 between persistent store 214 and CDP client 200 includes a Storage Area Network (SAN) connection. These are some example connections and in some embodiments other types of connections are used.

In some embodiments, a user is able to select or otherwise specify a set of one or more files, configurations, and/or settings to access or restore. For example, a user may only be interested in a particular document. In some embodiments, all data associated with a point in time is (or in some embodiments may optionally be) restored or accessed. Access and restoration are related in various ways in various embodiments. In some embodiments, restoration includes replacing a current version of data with prevision version data (e.g., stored in persistent store 214). In some embodiments, accessing a prior state or version does not necessarily cause data associated with a current state to be overwritten or removed. For example, in some embodiments access is provided simultaneously to both a (e.g., selected) prior state and a current state. In some embodiments, a user has the option to initiate a restore after accessing a prior state or version. For example, after viewing an older version of a document, a user can decide to restore the prior version so that the current version of the document is replaced with the prior version. In some embodiments, a user has the option of restoring a prior version or state without first viewing or accessing the prior state. For example, if data is known to have been corrupted at a certain time, a user may decide to restore a version prior to the known corruption time without first accessing or viewing that version. In some embodiments, only a subset of accessed data is restored (e.g., many documents are accessed but only a few are restored). In some embodiments, multiple versions of a given piece of data are able to be accessed at the same time (e.g., a user is able to simultaneously access the same document at different points in time to compare or review differences at various points in time).

Figure 2B:
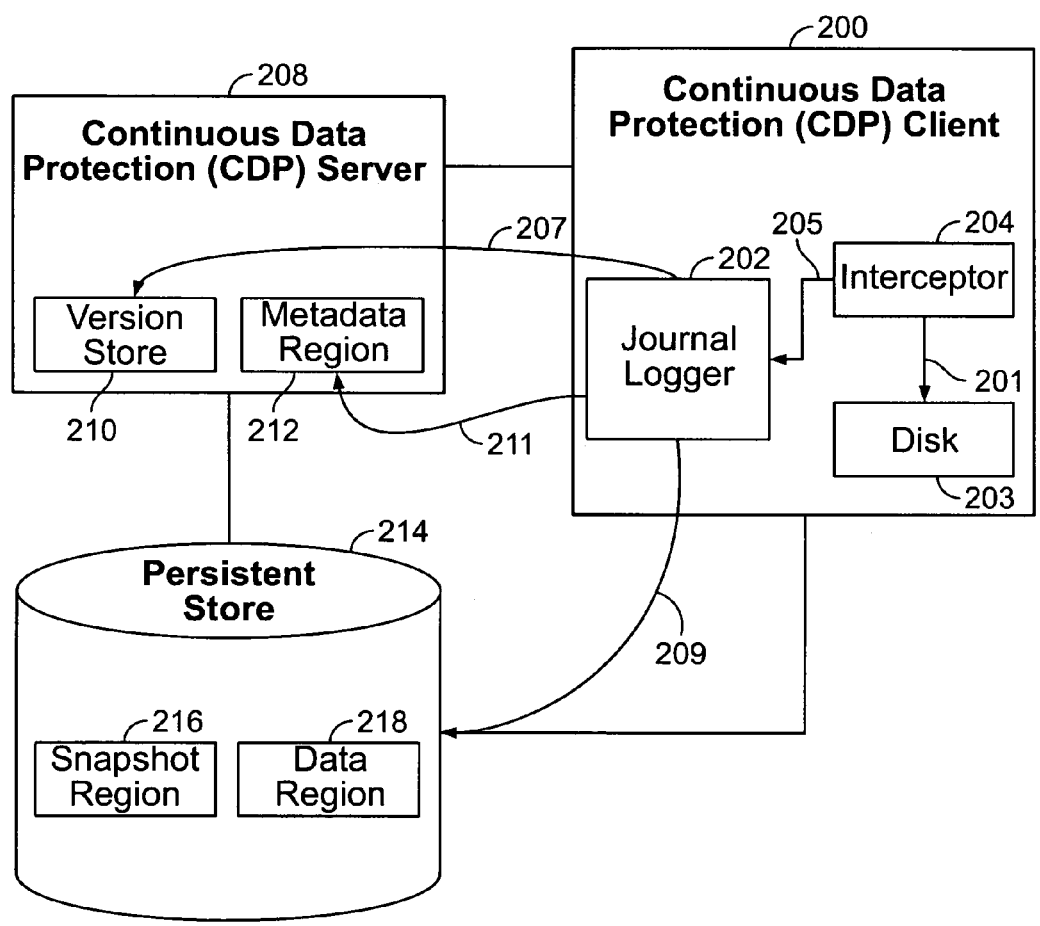
FIG. 2B is a diagram illustrating an embodiment of an information exchange associated with providing continuous data protection for a CDP client.

FIG. 2B is a diagram illustrating an embodiment of an information exchange associated with providing continuous data protection for a CDP client. In the example shown, previous version data that records the various states or versions of data on CDP client 200 is stored in persistent store 214. In some embodiments, there is a corresponding flow or exchange of information performed in the event of an access or restore. In this example, previous version data comprises blocks associated with a file system. A block is a storage unit used by a file system to store data in storage media (e.g., magnetic disk). The size of a block varies in various embodiments and can, for example, vary depending upon the particular file system running on CDP client 200. Although this example and other examples describe previous version data that includes blocks, in some embodiments, previous version data does not comprise blocks. For example, in some embodiments, previous version data comprises data at a higher or more abstract level than blocks and/or objects at the file system level.

Block writes 201 are passed from interceptor 204 to disk 203. In some embodiments, interceptor 204 is a process or agent configured to run on CDP client 200 between a file system driver (not shown) and a disk driver (or other media driver). In some CDP systems, an interceptor does not change block writes that it passes from a file system driver to a disk driver. Intercepted block writes 205 are passed from interceptor 204 to journal logger 202. In some embodiments, each block write passed to journal logger 202 includes a source location (e.g., on disk 203) and a data value (e.g., the value written to disk 203).

Storage request 207 is passed from journal logger 202 to version store 210. Storage request 207 is used to obtain storage and this storage is used to store previous version data. In this example, storage requests 207 are passed to version store 210 at various points in time as storage that was previously allocated becomes filled with previous version data; i.e., a storage request is not sent each time new data has been intercepted. For example, when continuous data protection begins, a first storage request is passed from journal logger 202 to version store 210. Allocated storage that includes snapshot region 216 and data region 218 is obtained as a result of the storage request. At some point prior to filling up the allocated storage, another storage request is passed from journal logger 202 to version store 210. In some embodiments, the locations or portions of persistent store 214 that comprise snapshot region 216 and/or data region 218 change at a storage allocation. That is, memories allocated for back-to-back storage requests are not necessarily contiguous within persistent store 214. In some embodiments, the same portion of storage is reused so that the same locations are repeatedly allocated, with a location becoming available for reallocation, for example, as the data currently stored in the location is not longer required to be retained. In some embodiments, a reclamation algorithm or other process releases or frees for reallocation storage used to store (e.g., older) previous version data.

Once storage is allocated or otherwise obtained (e.g., a next location in a previously allocated group of storage locations is allocated, previous version data 209 is passed from journal logger 202 to persistent store 214. In various embodiments, this is implemented in a variety of ways. Tasks, functionality, and/or responsibilities associated with journal logger 202 and a process (if any) running on persistent store 214 is divided or assigned as appropriate. In some embodiments, journal logger 202 tracks the current location in persistent store 214 being written to (e.g., previous version data 209 includes or is otherwise associated with a storage location on persistent store 214 that a particular piece of previous version data is stored at). In some embodiments, a process running on persistent store 214 tracks or otherwise determines a location on persistent store 214 to write a particular piece of previous version data to.

Similarly, updating, managing, and/or accessing snapshot region 216 and/or data region 218 are distributed or assigned in a variety of ways in various embodiments. As described above, snapshot region 216 is associated with the state of CDP client 200 at a baseline time with the baseline time itself gradually changing. In this example, journal logger 202 writes previous version data to snapshot region 216 for the initial baseline time (i.e., when CDP protection begins). After the initial baseline time, versions store 210 is responsible in this example for updating snapshot region 216 as the baseline time changes (e.g., by moving previous version data from data region 218 to snapshot region 216 and/or deleting obsolete data from data region 218 and/or snapshot region 216). In other embodiments, version store 210 or some other process is wholly responsible for managing snapshot region 216. For example, journal logger 202 in some embodiments is not aware of snapshot region 216 and another process manages access to snapshot region 216.

Metadata records 211 are passed from journal logger 202 to metadata region 212. In some embodiments, a metadata record includes a storage location (e.g., on snapshot region 216 or data region 218), a source location (e.g., a location on disk 203 where an intercepted block write is written to), and/or a time (e.g., at which a block write is intercepted by interceptor 204). Storage location, source location, and/or a time are specified as appropriate for the particular configuration or implantation of a particular embodiment. In some embodiments, metadata region 212 is used to store metadata records for multiple CDP clients and a metadata record includes a CDP client identifier. Similarly, if persistent store 214 is associated with multiple physical storage devices, a storage location included in a metadata record may identify the particular storage device used and the location on that storage device where a given piece of previous version data is stored. In some embodiments, a single metadata record is used to track multiple intercepted block writes that are stored.

In some embodiments, an index, tree, table, or other data structure is used to look up or otherwise determine where previous version data is stored. Any data structure to identify the storage location of previous version data for a desired block at a desired point in time may be used. For example, some indices or other data structures are configured to output a storage block location when passed a desired time and a desired source block location. In some embodiments, an index or other data structure is structured or organized for fast or efficient lookup or determination of previous version data to retrieve from persistent store 214 in the event a prior version is accessed or restored. In some embodiments, an index is implemented as an R+tree where one dimension corresponds to space (e.g., a block location on the disk of CDP client 200) and another dimension corresponds to time (e.g., the time at which a block write to the disk of CDP client 200 is intercepted). In some embodiments, such an index is updated with a new entry or node as metadata records 211 are passed from journal logger 202 to metadata region 212. In some embodiments, a node in an index contains a copy of metadata records 211; alternatively in some embodiments a node in an index contains a link or reference to a corresponding metadata record (e.g., stored in metadata region 212). In one example, each node or entry in an index includes a record ID that identifies or describes the location of a corresponding metadata record stored in metadata region. In some embodiments, older nodes or entries are shifted or reorganized within an index as new entries or nodes are added to the index and/or older nodes or entries are deleted from the index. Alternatively, in some embodiments, there is no index or data structure separate from a metadata region used in identifying storage locations of desired previous version data. For example, in some embodiments, metadata is organized or structured in such a way that it is searchable.

In some embodiments, some or all of the illustrated exchange of information occurs in real time. That is, in some embodiments, there is no collection or aggregation of information into larger groups or units before information is processed or forwarded. In some embodiments, receipt of information triggers the information to be stored, forwarded, or otherwise processed accordingly without regard to the amount of information received and/or waiting for additional information to be received. For example, in some embodiments, intercepted block writes are passed to journal logger 202 as soon as they are intercepted by interceptor 204. In some embodiments, journal logger 202 immediately passes previous version data 209 to persistent store 214 and stores it in persistent store 214 as soon as intercepted block writes are received from interceptor 204. In some embodiments, as soon as one or more pieces of previous version data are stored in persistent store 214, a corresponding metadata record is generated and passed to metadata region 212. In some embodiments, this maintains groups of one or more block writes, where the groupings are determined by an operating system or file system associated with CDP client 200.

Figure 3A:
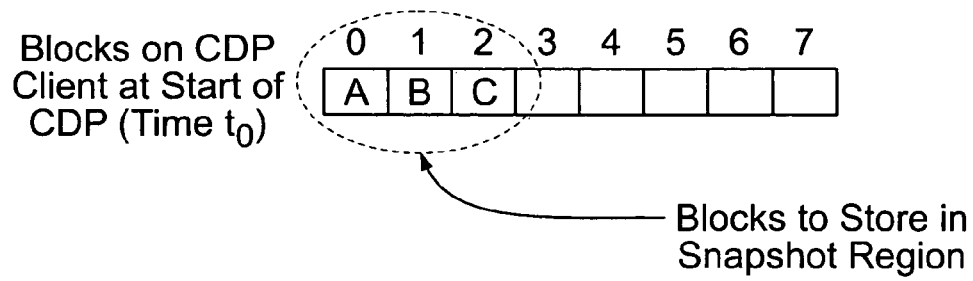
FIG. 3A is diagram illustrating an embodiment of blocks on a CDP client in a state at the start of continuous data protection.

FIG. 3A is diagram illustrating an embodiment of blocks on a CDP client in a state at the start of continuous data protection. In this example, eight block locations on the disk or other media of a CDP client are shown. A typical disk contains many more than eight blocks and the concepts illustrated with this example may be extended to any number of blocks on a disk and/or any number of blocks that are written at a time.

At time t0, continuous data protection of a CDP client begins. The state of the CDP client is captured at time t0 by copying the state of blocks on disk at time t0. In this example, block locations 0-2 contain the values A, B, and C, respectively, and block locations 3-7 contain no data. Any appropriate technique can be used to capture the state of blocks when continuous data protection begins. For example, some traditional backup systems are configured to perform block based backups where blocks are backed up as opposed to higher-level data objects such as files. In some embodiments, a technique associated with traditional block based backup is used to capture the state of blocks on a CDP client at the start of continuous data protection.

Figure 3B:
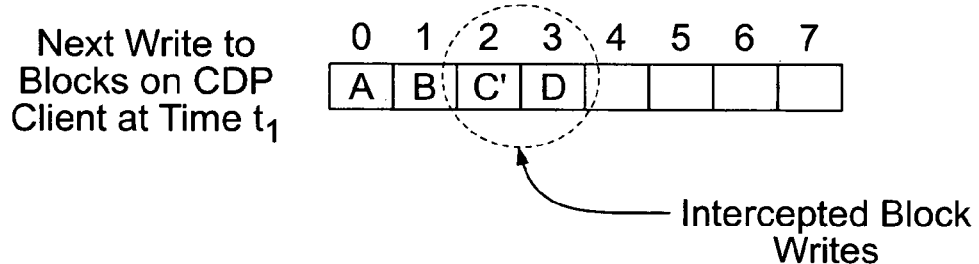
FIG. 3B is diagram illustrating an embodiment of a group of blocks on a CDP client in a state corresponding to a first point in time subsequent to the start of continuous data protection.

FIG. 3B is diagram illustrating an embodiment of a group of blocks on a CDP client in a state corresponding to a first point in time subsequent to the start of continuous data protection. In the example shown, a new data C' has been intercepted as being written to block 2 and an initial data D has been intercepted as being written to block 3 at or before a time t1 after time t0 (i.e., the initial state shown in FIG. 3A). In this example, an interceptor (e.g., that operates between a file system driver and a disk driver) intercepts these writes to block locations 2 and 3.

Figure 3C:
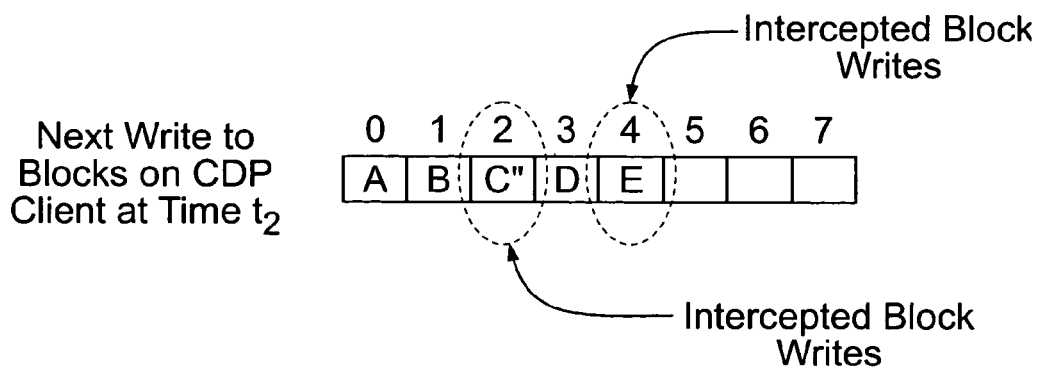
FIG. 3C is diagram illustrating an embodiment of a group of block s on a CDP client in a state corresponding to a second point in time after continuous data protection begins.

FIG. 3C is diagram illustrating an embodiment of a group of block s on a CDP client in a state corresponding to a second point in time after continuous data protection begins. In this example, at or before time t2 after time t1 (shown in FIG. 3B) the value C' in location 2 has been updated with the value C", and a new value E is stored in location 4. The values stored in locations 0, 1, and 3 have not changed since time t1.

The groups of block writes illustrated in FIGS. 3B and 3C reflect a grouping or number of block writes determined by a file system or operating system associated with a CDP client. That is, the writes to block locations 2 and 3 in FIG. 3B occur or are otherwise intercepted at substantially the same time (i.e., t1). Similarly, the writes to block locations 2 and 4 in FIG. 3C are associated with the time t2. In some cases, the amount of time separating t1 and t2 is limited by how fast consecutive groups of one or more block writes can be performed. In some cases, an operating system or file system enforces some rule about the number or size of a group of writes (e.g., the example groups in FIG. 3B or 3C). For example, some operating systems only perform block writes in multiples of some base quantity or unit of measurement. For example, an operating system may perform block writes in multiples of four blocks so that only writes of four blocks, eight blocks, twelve blocks, etc. are performed.

Figure 4A:
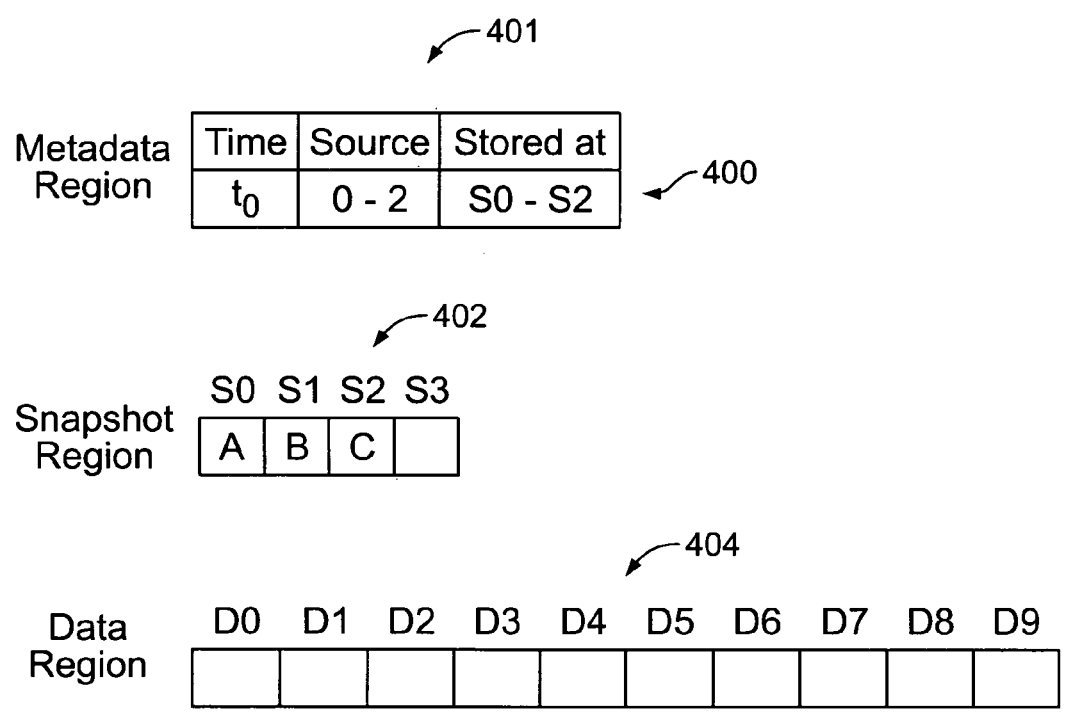
FIG. 4A is a diagram illustrating an embodiment of snapshot data and an associated metadata record.

FIG. 4A is a diagram illustrating an embodiment of snapshot data and an associated metadata record. In the example shown, the snapshot data and metadata record correspond to the example of FIG. 3A. In this example, metadata region 401 is used to store metadata records to track previous version data and snapshot region 402 is used to store snapshot data.

The values shown in FIG. 3A at time t0, values A-C, are stored in snapshot region 402 in locations S0-S2, respectively. In the example shown, only four locations (S0-S3) have been allocated to store the snapshot/baseline data. In some embodiments, the number of storage locations allocated to store baseline data is the same as the number of blocks associated with a data set with respect to which protection is being provided, i.e., eight locations in the example shown in FIGS. 3A-3C. In the example shown in FIGS. 3A-3B, for example, the latter approach would allow for baseline data to be written in the snapshot area for blocks that did not have any data at time t0, as may be required, for example, as the baseline time starts to advance. In some embodiments, additional (in some embodiments contiguous) storage locations are allocated to the snapshot region if/when required, e.g., as the baseline time advances with the advance of the sliding protection window. In the example shown in FIG. 4A, time t0 corresponds to a baseline time and thus data values associated with time t0 are stored in snapshot region 402. To track the stored snapshot data, metadata record 400 is created and stored in metadata region 401. Metadata record 400 includes a time at which the data values were intercepted (e.g., time t0), source location(s) that describe location(s) where the values were located on a CDP client (e.g., block locations 0-2 on a CDP client), and storage location(s) where the data values are stored (e.g., block locations S0-S2 on a persistent store).

In this example, a single metadata record (i.e., metadata record 400) is used to track source location(s) and storage location(s) for all data values captured at a baseline time. In some embodiments, there is a one to one correspondence between metadata records and stored data. For example, in such embodiments, there would be three metadata records used to track the stored values A-C.

Alternatively, in some embodiments, a metadata region is not used to track snapshot region entries and is only used to track entries in the data region. In some embodiments, a snapshot region is self describing, and can be used to store a full image as well as a sparse image. In some cases, a full image refers to cases where every block of a file system is recorded even though a particular block might not have data. On the other hand, if only blocks that have data are recorded (e.g., on the CDP client file system) then this is the case of a sparse image.

Figure 4B:
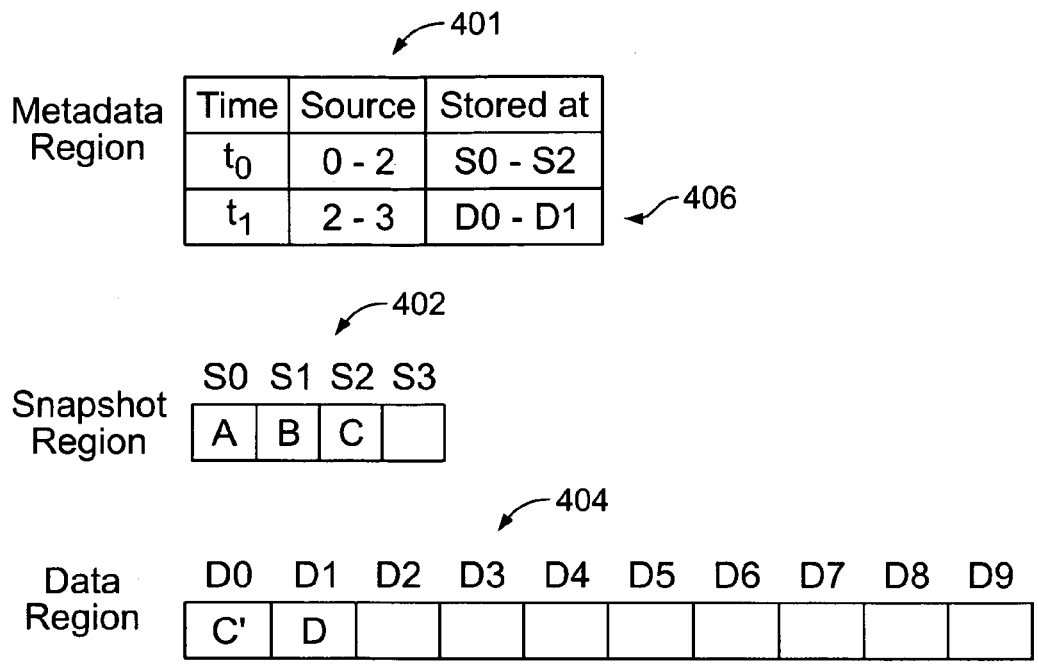
FIG. 4B is a diagram illustrating an embodiment of previous version data and a corresponding metadata record that are stored based upon a first group of intercepted block writes.

FIG. 4B is a diagram illustrating an embodiment of previous version data and a corresponding metadata record that are stored based upon a first group of intercepted block writes. In the example shown, the previous version data that is stored in the data region comprise the first group of block writes intercepted after continuous data protection begins. This example corresponds to the example of FIG. 3B.

The data values C' and D which were intercepted are stored in locations D0 and D1, respectively, of data region 404. In this example, non-snapshot data is stored in data region 404 and thus the data values C' and D are stored in data region 404 as opposed to snapshot region 402. In some embodiments, if the baseline time were to advance to time t1, e.g., as the sliding protection window began to advance, the data value D stored at D1 would be copied to S3 in the snapshot region and the baseline time associated with the snapshot region updated to time t1.

Metadata record 406 is added to metadata region 401 and is used to track the previous version data, C' and D. Metadata record 406 includes the time at which the block writes are intercepted (e.g., t1), the source locations on a CDP client (e.g., block locations 2-3), and the locations where the values C' and D are stored (e.g., D0-D1).

Figure 4C:
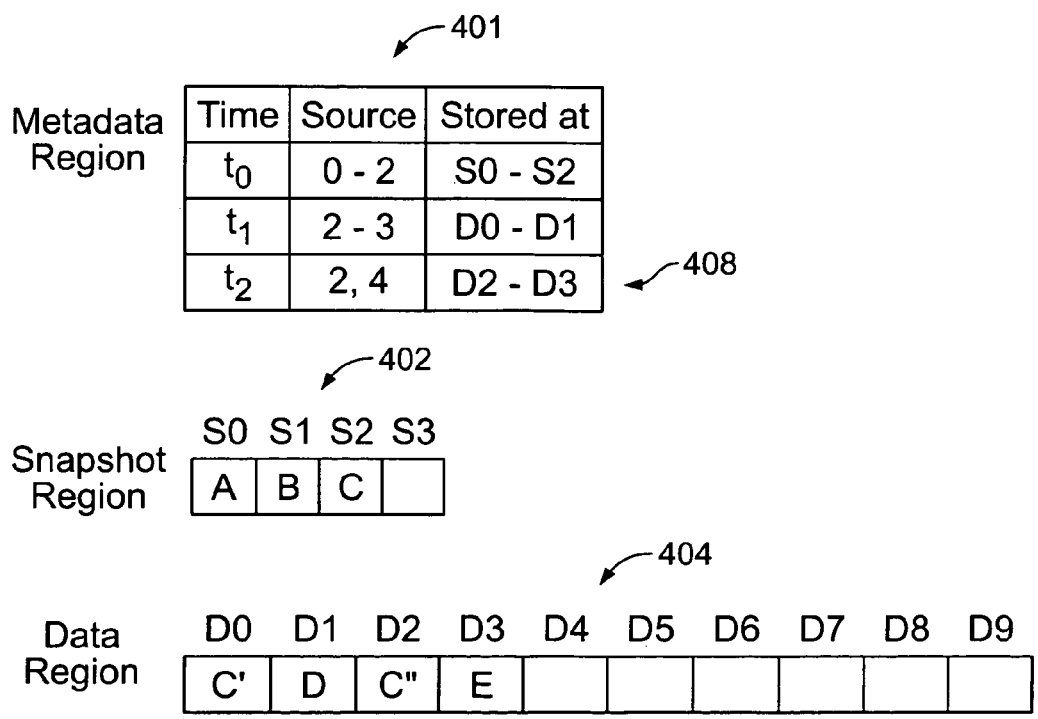
FIG. 4C is a diagram illustrating an embodiment of previous version data and a corresponding metadata record that are stored based on a second group of intercepted block writes.

FIG. 4C is a diagram illustrating an embodiment of previous version data and a corresponding metadata record that are stored based on a second group of intercepted block writes. In the example shown, this figure corresponds to the example intercepted block writes of FIG. 3C.

The values C" and E are stored in block locations D2 and D3 respectively of data region 404. Metadata record 408 is added to metadata region 401 and corresponds is used to track the previous version data, C" and E. Metadata record 408 includes time t2 (i.e., the time at which the block writes were intercepted), source locations (e.g., block locations 2 and 4 on a CDP client), and storage locations (e.g., block locations D2-D3 on data region 404).

In the examples shown above, data is written contiguously within data region 404. Writing data in a contiguous fashion in some applications minimizes or reduces write times to data region 404. For example, if data region 404 is stored on a disk drive system, the seek time to move a read/write head to a new write location is minimized or reduced since data is written to an adjacent write location and no "jumps" are performed. Reducing write times is desirable in some scenarios, for example if there are a lot of changes to the state of a CDP client. In some applications, it is desirable to keep up with changes as they occur on a CDP client so that buffering of information is eliminated or reduced. In some applications, it is desirable to reduce latency between intercepting a group of one or more block writes and storing previous version data on a persistent store.

A single metadata record is used in the examples shown above to track a group of intercepted blocks writes. In some cases, a group may include a single block write. In some embodiments, a group of block writes reflects a grouping determined by a file system or an operating system. That is, aggregation or regrouping may not necessarily be performed and a grouping determined or otherwise established by a file system or an operating system is preserved. By preserving the operating system or file system's grouping, the states of a CDP client can be protected (and if so desired, subsequently accessed and/or restored) with a time granularity matching that with which blocks are written to the disk of a CDP client. This time granularity may in some cases be on the order of a fraction of a second, which is a much finer time granularity relative to that offered by some traditional backup systems.

In the event of an access or restore, the metadata records stored in metadata region 401 and data stored in snapshot region 402 and/or data region 404 are used. For example, a user may want to access the state at some point in time within the range [t1, t2) where the open square bracket "[" indicates that the range includes t1 and the close parenthesis ")" indicates that the range does not include t2. In some embodiments, the records in metadata region 401 are searched based on a point in time to access or restore and blocks to retrieved are determined. For example, the data stored in S0 and S1 of snapshot region 402 and the data values stored at D0 and D1 of data region 404 are determined to be the appropriate blocks to retrieve based on the desired time within the range [t1, t2). In some cases, not all blocks associated with a given metadata record are retrieved and used to provide access or perform a restoration. For example, if the state of the CDP client at time t2 is restored, the data value D stored at D1 is used but the data value C' stored at D0 is not used (i.e., the data value C" stored at D2 is used instead).

In various embodiments, the examples of the above figures are modified and/or supplemented using various techniques. For example, in some embodiments, a single region of storage is used to store data values regardless (e.g., there is only a data region and no snapshot region). In some embodiments, the structure or fields included in a metadata record are different than the examples described above. For example, in some embodiments, a given metadata record is used to track all values that correspond to a given source location (e.g., a metadata record for source location 0, another metadata record for source location 1, etc.). In some embodiments, an index is used to facilitate faster searching during a restore event. This index (if used) is updated as appropriate. For example, in some embodiments, a new node is added to an index when each one of metadata records 400, 406, and 408 are added to metadata region 401. In some embodiments, the index stores for each block, and for each iteration or version of data stored at that block at any time during the current protection window, a pointer to the location(s) in the snapshot region and/or data region where the previous version data for that block (as it existed at the time of interest) is stored. In some embodiment, the index stores a pointer to the metadata record(s) associated with the blocks, which metadata records in turn include pointers to the locations in which the previous version data are stored. If a block has not been changed since the snapshot at t0, the index points to the corresponding value in the snapshot. Once updated, depending on the time of interest the index points to either the snapshot location (e.g., time of interest before first change to block) or a corresponding location in the data region (block changed since snapshot). Such indexing facilitates retrieval and/or restoration of a prior version of a particular file or other document, for example. A process on the client (or CDP server), e.g. a process running at an application or other level higher than the block level at which the interceptor/journal logger operate, as described above, determines which blocks were associated with the file at the time of interest, and the index is used to retrieve the previous version data that was stored in the specified blocks at the time of interest.

Figure 5:
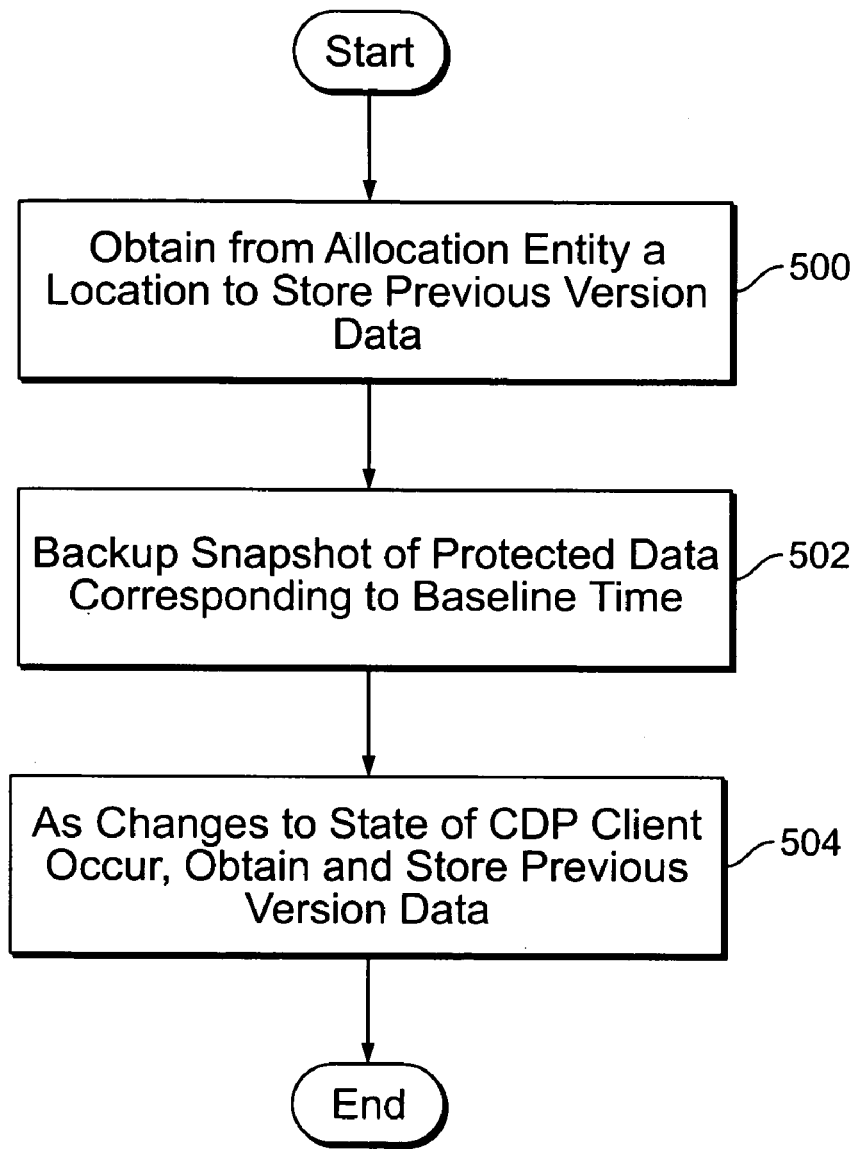
FIG. 5 is a flowchart illustrating an embodiment of a process for performing continuous data protection of a CDP client.

FIG. 5 is a flowchart illustrating an embodiment of a process for performing continuous data protection of a CDP client. In some embodiments, the process is performed by a journal logger running on a CDP client being continuously protected. In some embodiments, some part of the example process is performed by some other entity or sub entity. For example, in some continuous data protection systems, step 502 is performed by a separate module called a baseline image creator. In some embodiments, a journal logger interfaces with one or more other processes to perform some or all of the steps shown. For example, a version store running on a CDP server may assist, service, or work with a journal logger to perform one or more of the steps shown.

In the example shown, at 500 a location to store previous version data is obtained from an allocation entity. For example, in some embodiments, a storage area allocation request or indication is passed to a storage allocation entity. In some embodiments, the allocation entity comprises and/or is associated with version store 210 of FIG. 2A. An appropriate amount of storage to allocate is determined (e.g., in some embodiments by a storage allocation entity and in some embodiments by a requesting entity). In some embodiments, the amount of storage to be allocated is determined based at least in part on a (maximum) size of a data set (protected entity) to be protected and an (e.g., user supplied) expected rate of change to the data set. For example, in some embodiments, if the protected entity comprises 10 GB (maximum, even if not fully populated with user data initially) and is expected to undergo changes at a rate of 1 GB per hour, then to provide a 10 hour protection window 10 GB of space is allocated to store baseline data (e.g., an initial and subsequently updated snapshot) and 10 GB (1 GB per hour times 10 hour window) plus some buffer (e.g., an additional 2 GB, i.e., room an additional 2 hours of changes), for a total of 12 GB, is allocated to store previous version data as changes are made subsequent to the initial snapshot. In some embodiments, the buffer is provided to enable changes to continue to be logged while processing is performed (as explained more fully below) to reclaim space in which older previous version data is stored.

A snapshot of protected data corresponding to a baseline time is backed up at 502. In some embodiments, snapshot data is stored in a storage region or locations (e.g., a designated portion of a disk or disk array) associated with a snapshot (e.g., a snapshot region). In some embodiments, both snapshot data and non-snapshot data are stored in the same region or locations. In some embodiments, snapshot data is written contiguously to a persistent store so that no "jumping" is performed across storage locations.

As changes to the state of a CDP client occur, previous version data is obtained and stored at 504. In some embodiments, block writes to a disk or other media of a CDP client are intercepted and these intercepted block writes are stored as previous version data on a persistent store. In some embodiments, previous version data is obtained in some other manner besides intercepting block writes. For example, in some embodiments data at some higher or more abstract level is obtained.

In various embodiments, one or more of the above steps are repeated, modified, and/or skipped. For example, in some embodiments, prior to filling up an allocated storage, step 500 is repeated to obtain additional storage. In some embodiments, an obtained location in storage is adjacent to a location that was obtained immediately prior (e.g., obtain locations 0-99 and subsequently obtain locations 100-199). In some applications it is desirable to be able to continue writing in subsequently obtained locations without jumping (e.g., location 99 is right next to location 100).

Figure 6A:
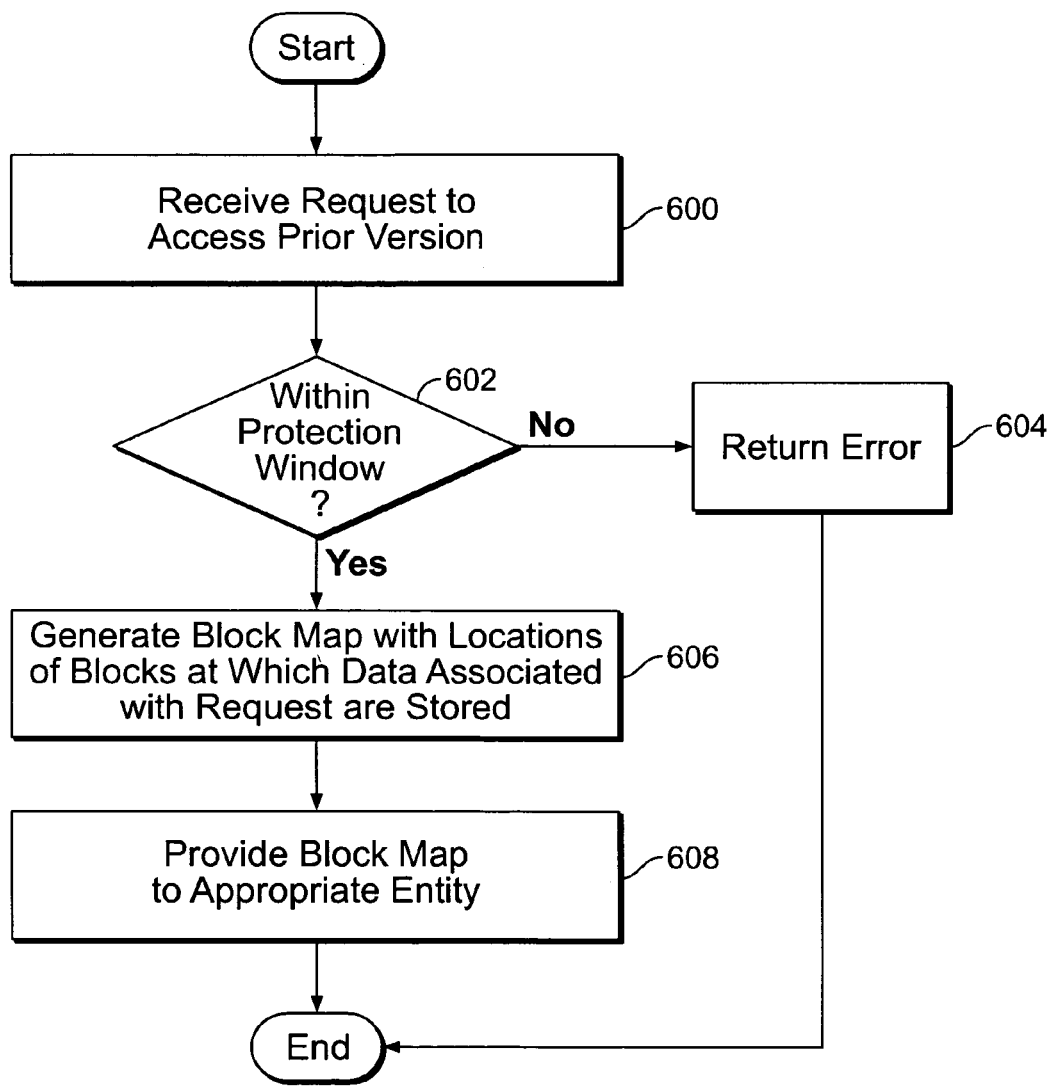
FIG. 6A is a flowchart illustrating an embodiment of a process to generate a block map when providing access to a prior version or state.

FIG. 6A is a flowchart illustrating an embodiment of a process to generate a block map when providing access to a prior version or state. In the example shown, the process is performed by a process associated with a CDP server, such as version store 210 of FIG. 2A. In some embodiments, there is a counterpart process, for example performed by a virtual access interface associated with a CDP client. In some embodiments, the described process is used to generate a block map for a selected group of objects or data associated with a CDP client (e.g., specific files stored on CDP client or a certain setting/configuration). Alternatively, in some embodiments the example process is used to generate a block map for all objects or data associated with a prior version. In some embodiments, the same or a similar process is used to generate a block map when restoration is performed.

At 600, a request to access a prior version is received. In some embodiments, a request includes a time for which access is desired. In some embodiment, a group of objects to access is optionally included in a request. For example, some continuous data protection systems are configured to be able to provide access for a user-selectable group of objects should a user so desire to specify a group.

It is decided at 602 whether a desired prior version is within a protection window. In this example, a protection window defines prior versions of data that are available to be accessed or restored. In some embodiments, a desired time (e.g., included in a request received at 600) is compared to a baseline time of a protection window. In some embodiments, a reclamation pointer is used to track a baseline time. If a desired time is less than a baseline time, it is determined in some embodiments that the desired prior version is not within the protection window. If so, an error is returned at 604.

If it is within a protection window, at 606 a block map is generated with locations of blocks at which data associated with a request are stored. In some embodiments, metadata records in a metadata store are examined and locations of appropriate blocks are determined based on (for example) a time obtained at 600. In some embodiments, an index is used, for example as described above. Referring to the examples of FIGS. 4A-4C, metadata records in metadata region 401 are examined to generate an appropriate block map. In some embodiments, it is first determined which metadata records are associated with times prior to a requested prior version (e.g., for a time after t1 but prior to t2, metadata records 400 and 406). Then, for each source block location, a corresponding storage block location that contains the most recent data value is determined. For example, source block location 0 corresponds to storage block location S0, source block location 1 corresponds to storage block location S1, source block location 2 corresponds to storage block location D0, and source block location 3 corresponds to storage block location D1. The block map generated for this example is (S0, S1, D0, D1). In some embodiments, an index that facilitates faster searching is used in generating a block map.

At 608, a block map is provided to appropriate entity. For example, in some embodiments, a block map is provided to a virtual access interface or other entity responsible for retrieving data from the block locations specified in a block map. Any appropriate communication or transfer technique (e.g., push/pull) may be used to provide a block map to an appropriate entity.

Figure 6B:
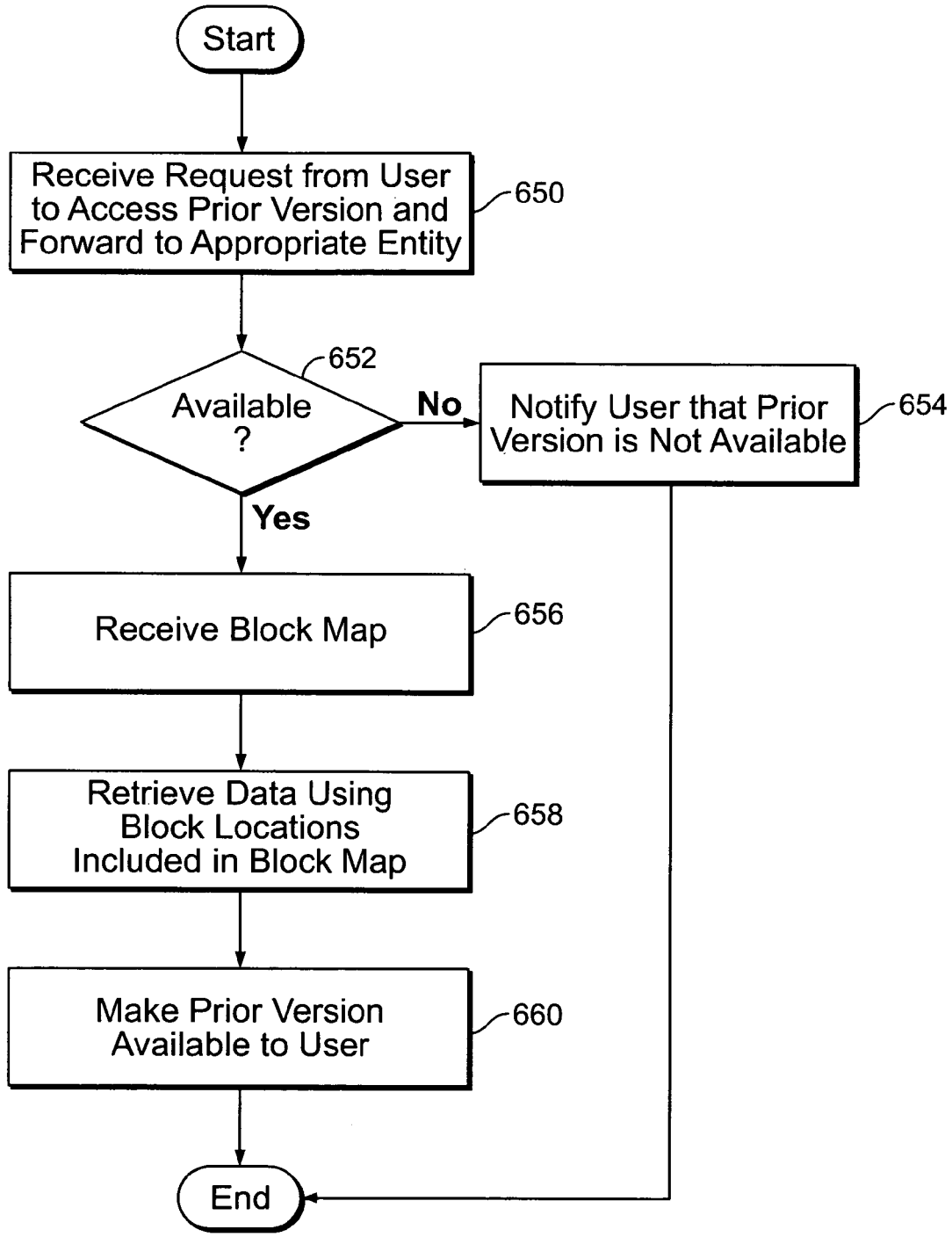
FIG. 6B is a flowchart illustrating an embodiment of process to provide access to prior version data in response to a user request.

FIG. 6B is a flowchart illustrating an embodiment of process to provide access to prior version data in response to a user request. In the example shown, the process is performed by a virtual access interface associated with a CDP client. In this example, there is a counterpart process that generates a block map (FIG. 6A shows an example of such a counterpart process). In some embodiments, a virtual access interface is associated with a (e.g., graphical) user interface via which a user initiates an access/restore or provides settings or configurations (e.g., optionally select a group of desired objects or data, a time/date to access, specify whether access or restoration is desired, etc.). In some embodiments, the same or a similar process is used when restoration is performed.

At 650, a request from a user to access a prior version is received and is forwarded to an appropriate entity. For example, in some embodiments, a request is forwarded or otherwise sent to a version store associated with a CDP server. It is determined at 652 whether a desired prior version is available. For example, in some embodiments an error is returned in the event a desired prior version is not available. If it is not available, a user is notified that a prior version is not available at 654. Otherwise, at 656 a block map is received. In some embodiments, 650 includes requesting a block map from, for example, a version store or other process at the CDP server and the determination at 652 is made based at least in part on whether a block map is received.

At 658, data is retrieved using block locations included in a block map. For example, in some embodiments the block locations included in a block map are associated with a persistent store and a virtual access interface retrieves data from a persistent store at the block locations included in a block map. In some embodiments, data is stored locally on a CDP client in order to provide access to a user. Any appropriate storage can be used to hold or store retrieved data.

At 660, a prior version is made available to a user. In some embodiments, providing access includes rendering a visual representation of an object where displayed information is not necessarily able to be selected, manipulated, or operated on. For example, a file may be displayed as a JPEG file or a PDF file where text is not necessarily selectable. In some embodiments, presented data associated with a prior version can be manipulated or operated on by a user (e.g., an old value or setting can be copied to a current version and/or a prior version of an object is able to be manipulated or modified). In some embodiments, making a prior version available includes displaying a new workspace that is separate or distinct from a workspace associated with a current version or state. In some embodiments, there are mechanisms available for a user to be able to detect corresponding data, for example, in order to observe where and/or how data has changed or not changed. For example, font color and/or connecting lines may be used to highlight corresponding portions between two versions of a file.

In some embodiments, after accessing a prior version, a user is able to optionally restore that prior version should he desire to do so. In some embodiments, a user is able to specify a subset of accessed data or objects to be restored. For example, a user may view multiple files but select certain files to be restored.

The previous figures illustrate an example distribution of services, operations, or functions associated with providing access to a prior version. In some embodiments, other processing is performed, for example to supplement or replace one or more steps illustrated in the examples above. In some embodiments, functionality is distributed in some other manner (e.g., between a virtual access interface and a version store) than in the example described above. For example, in some embodiments, a version store is responsible for retrieving stored data and forwarding it to a virtual access interface.

In some embodiments, multiple protection windows are supported. For example, during a first protection window that includes the current state, continuous data protection is supported. During a second protection window adjacent to the first, only certain states or versions (e.g., with coarser time granularity) are able to be restored; this is similar to the capabilities provided by a traditional backup system except the coarser granularity is a policy-based progression from a CDP state to a coarser state. In some embodiments, additional processing is performed to support multiple protection windows. For example, if a desired prior version falls into the second protection window, available state(s) that are nearby are determined. In some embodiments, one or more available states are communicated to a user. For example, a message is presented to a user saying, "You have requested access to Jul. 1, 2006 at 3:00 pm. The closest available time is Jul. 1, 2006 at 6:00 pm. A version at Jun. 30, 2006 at 6:00 pm is also available."

Figure 7:
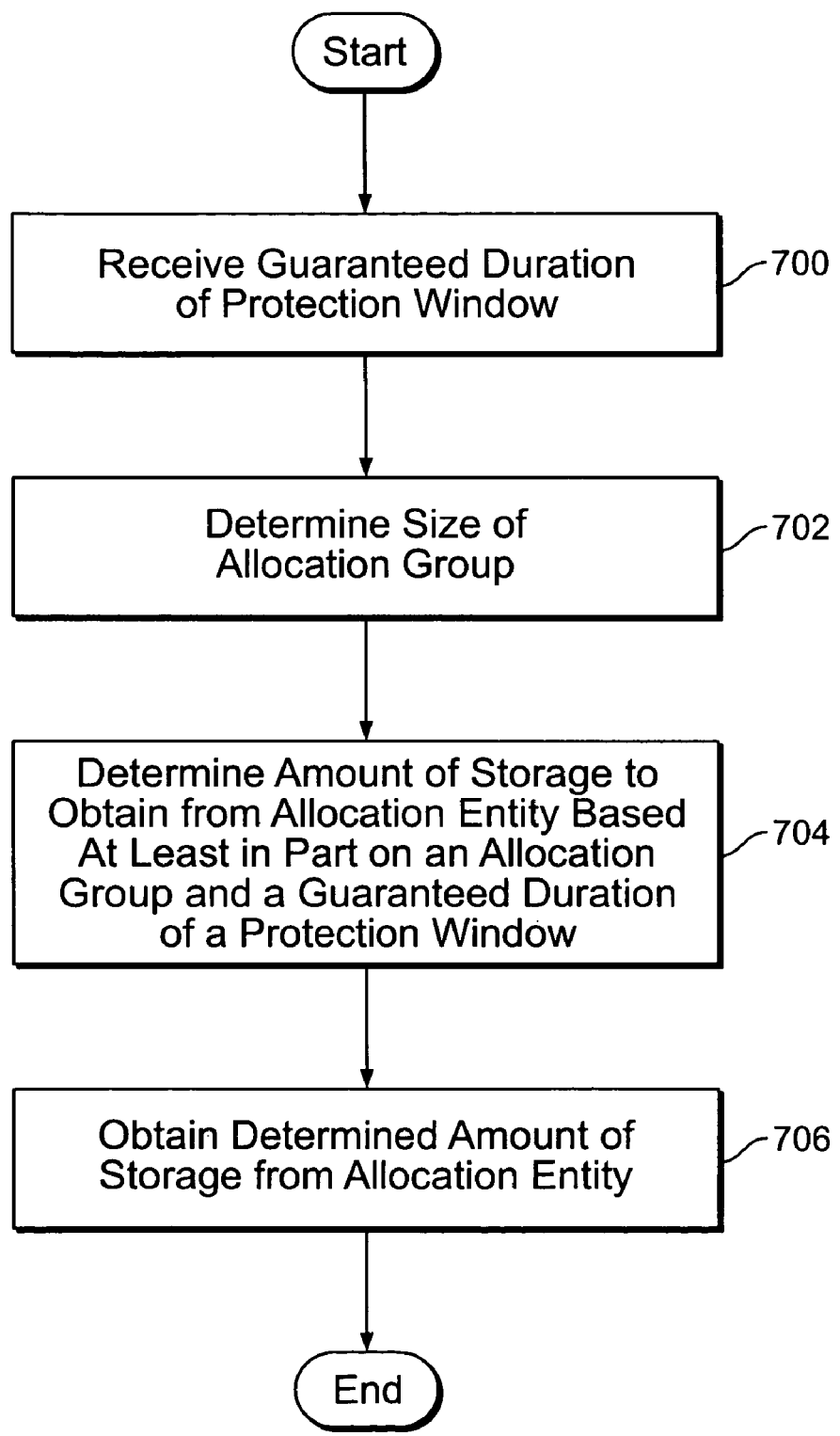
FIG. 7 is a flowchart illustrating an embodiment of obtaining storage to store previous version data.

FIG. 7 is a flowchart illustrating an embodiment of obtaining storage to store previous version data. In some embodiments, the process is performed by a journal logger associated with a CDP client. In some embodiments, the example process is used at step 500 to obtain storage.

In the example shown, at 700 the desired duration of a protection window is received. For example, a user may specify that he wants continuous data protection for at least 10 days. In various embodiments, various capabilities or features are supported and appropriate information is obtained from a user. In some embodiments, information such as business rules and/or prioritization of data to be protected is obtained from a user. For example, a user may care more about certain files (e.g., patient records) than other files (e.g., pictures from the office picnic). In some embodiments, business rules that describe rules for retaining and/or discarding information are obtained. In some embodiments, different sets of data on a given CDP client have different protection windows and/or protection rules.

At 702, the size of an allocation group is determined. In some embodiments, the size of an allocation group is an integer multiple of an allocation unit. An allocation unit in some embodiments corresponds to a minimum and/or prescribed number of blocks included in a write operation by a journal logger. In some embodiments storage locations (e.g., on disk) that contain relatively old data is virtually reclaimed in allocation units, e.g., as new previous version data is written by the journal logger in such units, but storage is allocated in larger allocation groups to ensure the journal logger can write successive allocation units of data in contiguous regions on the storage media. In some embodiments, an allocation unit is based on a cluster size associated with the operating system of a CDP client, which in some embodiments enables the journal logger to avoid having to fragment operating system writes across multiple writes by the journal logger and may facilitate reclamation of storage space in contiguous chunks. For example, an allocation unit may be 2 KB, 4 KB, 8 KB, etc. The size of an allocation group can be determined or obtained in any appropriate manner. In some embodiments, the size of an allocation group is a programmable value and/or is obtained from a register. In some embodiments, the size of an allocation group corresponds to a fixed, configured, configurable, and/or programmable multiple of a fixed allocation unit.

An amount of storage to obtain from an allocation entity is determined based at least in part on an allocation group and a desired duration of a protection window at 704. In some embodiments, the amount of storage to obtain is constrained or otherwise limited to be an integer multiple of an allocation group. In some embodiments, an amount of storage is calculated to be sufficient to satisfy the desired duration associated with a protection window (e.g., based on expected conditions or scenarios). For example, if 1 MB in changed data is expected per day and 10 days of protection is desired, 10 MB is calculated. In some embodiments, a buffer (e.g., an additional 2 MB) is included.

In some embodiments, other information in addition to or in place of an allocation group and/or a protection window is used in determining an amount of storage to obtain. In some embodiments, this information is provided or specified by a user. For example, in some embodiments, a user is queried about expected or typical changes to the state of CDP client. For example, a user may be asked how many hours a day they work on a document, how much traffic a server receives, changes to routing tables managed by a router, etc.

In some embodiments, at least some information used in determining an amount of storage to obtain is gathered automatically and/or without requiring user interaction. For example, in some embodiments, there is an observation period during which a process observes changes to the state of a CDP client so that usage and/or change characteristics are obtained. For example, some observation processes are configured to be able to observe that a particular CDP client is rarely changed and thus less storage is likely to be needed to store previous version data. Some observation processes are able to determine that a particular object associated with a CDP client changes frequently and that the changes include a significant number of additions (e.g., a blog or patient notes). Some observation processes are able to determine that an object is changes frequently and that the changes include a significant number of overwrites (e.g., a restaurant menu or the main page of a news website). These observed characteristics (e.g., augmentation versus overwriting) are used in some embodiments in determining an amount of storage to obtain.

At 706, the determined amount of storage is obtained from an allocation entity. For example, in some embodiments, storage is obtained from a version store. In some embodiments, a request or indication is sent to an allocation entity and includes an amount of storage determined at 704.

In some embodiments, some or all of the example process is repeated as needed. For example, in some embodiments, a journal logger obtains storage from an allocation entity when storage being written to becomes full or at a pre-determined point before it becomes full. In some embodiments, steps 700-704 are performed once and an amount of storage to obtain is not necessarily calculated repeatedly.

In some embodiments, some or all of the described steps are performed by another entity in combination with or as an alternative to a journal logger. For example, in some embodiments, a journal logger indicates to a version store when storage is needed to store previous version data; the version store is responsible for determining an amount of storage to allocate. In some embodiments, an administrator and/or other authorized user determines the amount of storage to be requested and/or allocated.

Figure 8:
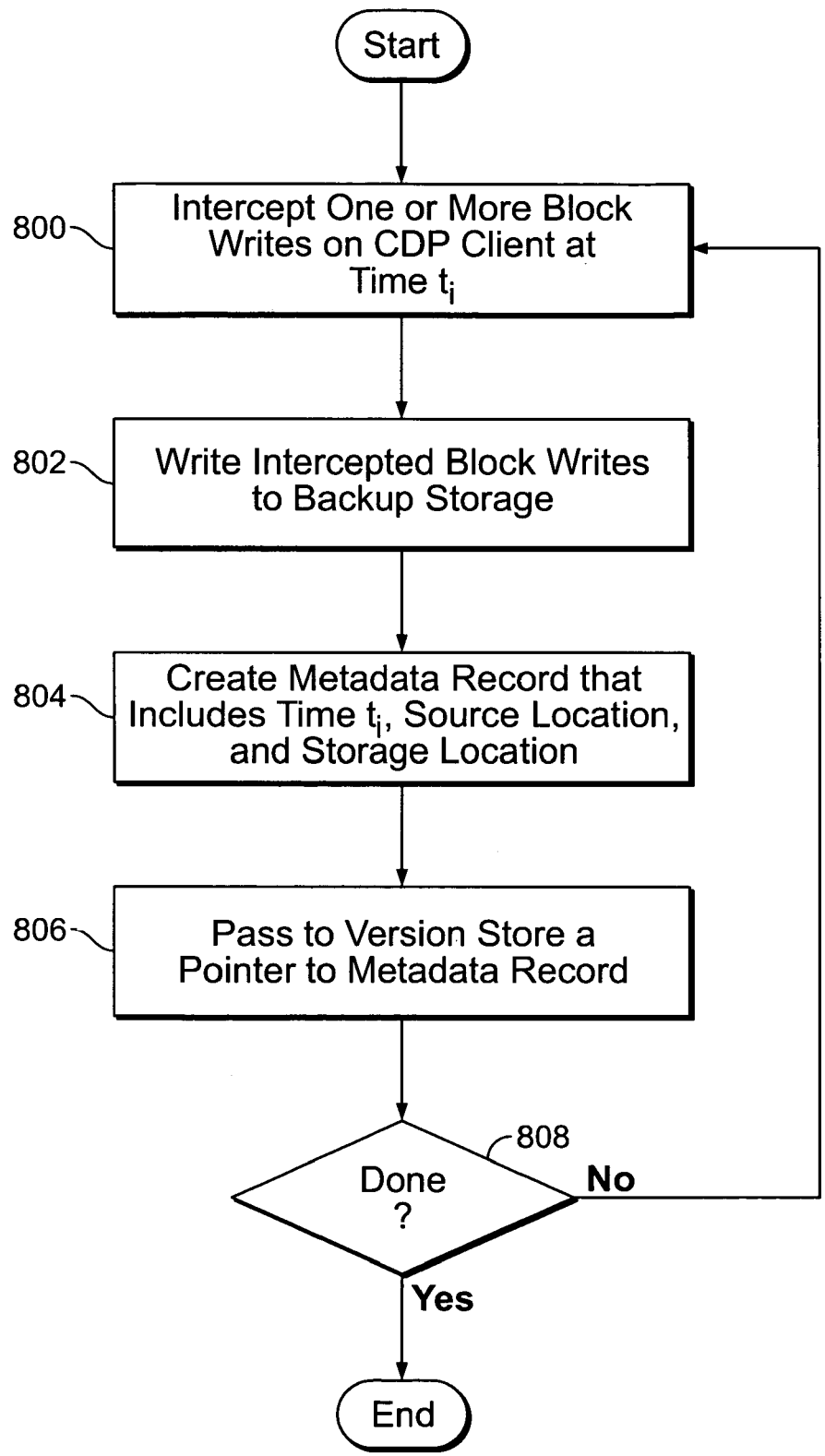
FIG. 8 is a flowchart illustrating an embodiment of a process for storing previous version data as data on a CDP client changes.

FIG. 8 is a flowchart illustrating an embodiment of a process for storing previous version data as data on a CDP client changes. In the example shown, the illustrated process is performed by an interceptor and a journal logger associated with a CDP client being continuously protected. In some embodiments, the example process is used at 504 to store previous version data as changes occur after a snapshot has been recorded at an initial baseline time.

At 800, one or more block writes on a CDP client are intercepted at time $t_i$. In some embodiments, an interceptor operating between a file system driver and a disk driver performs step 800. At 802, the intercepted block writes are stored. In some embodiments, an interceptor passes intercepted block writes to a journal logger and the journal logger stores the intercepted block writes on persistent storage.

A metadata record is created that includes time $t_i$, source location, and storage location at 804. For example, a metadata record may be created that includes a time of interception, where the blocks originated from on a CDP client, and where such blocks are backed up. In this example, a single metadata record is used to track a group of one or more block writes. In some embodiments, a metadata record is created for each block, for example to facilitate reclaiming individually blocks included in the same write.

At 806, a pointer to a metadata record is passed to a version store. In some embodiments, steps 804 and 806 are performed by a journal logger. In some embodiments, a pointer is not passed to a version store. For example, in some embodiments, some table or other data structure that is accessed by a version store when such information is desired (e.g., periodically to determine previous version data to remove and/or if a user requests access or restoration of a prior state that is backed up) is updated to reflect a new metadata record. That is, in some embodiments a version store is not necessarily made immediately aware of the existence of a new metadata record.

It is decided at 808 whether a process is done. In some embodiments, a process does not end unless continuous data protection ends. Subsequent writes, if any, are intercepted and processed (800-806) until continuous protection ends (808).

Figure 9A:
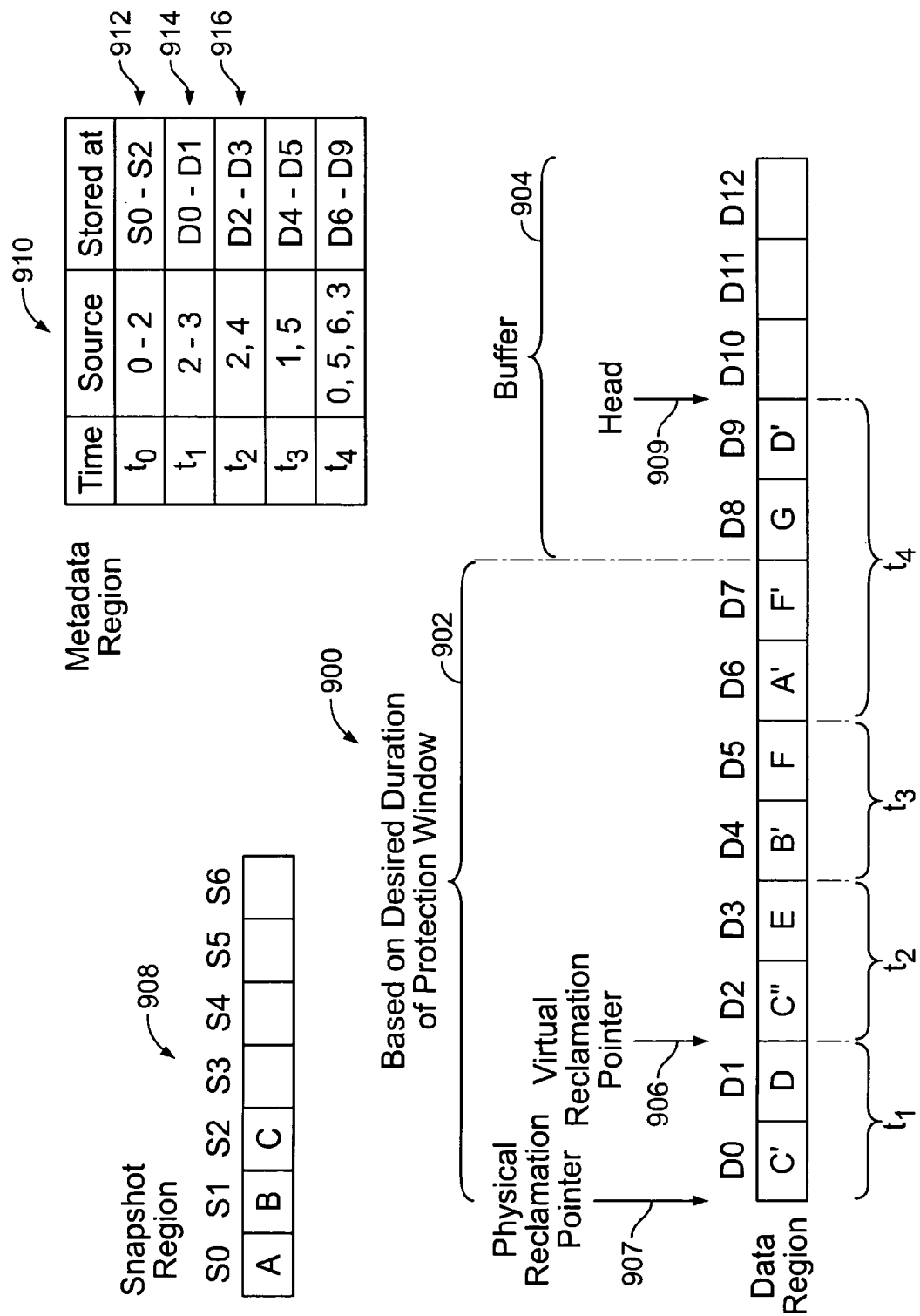
FIG. 9A is a diagram illustrating an embodiment of a reclamation pointer used to track virtual reclamation.

FIG. 9A is a diagram illustrating an embodiment of a reclamation pointer used to track virtual reclamation. In some embodiments, reclamation includes virtual reclamation (i.e., data no longer made available to restore, for example by using application logic to block fulfillment of requests for versions associated with times prior to a current virtual reclamation time) and physical reclamation (i.e., data is physically overwritten and/or an index updated such that data is no longer present in an original location and/or an application no longer knows where it is, such that a request to restore that required the data could not be fulfilled even if application logic did not block the request). In some embodiments, reclamation (including virtual and physical reclamation) is performed by a version store.

Data region 900 comprises contiguous storage locations that are allocated by an allocation entity. For example, in some embodiments, a journal logger obtains from a version store an allocated range of storage locations. In some embodiments, data region 900 is located on a persistent store. Data region 900 comprises of portion 902 and buffer 904. In the example shown, the size of portion 902 is determined based on a desired duration of a protection window and buffer 904 is some additional storage. For example, if 10 days of continuous protection is desired and 1 GB of changes is expected or is typical per day, portion 902 has a size of 10 GB. Buffer 904 is any appropriate size (e.g., 2 GB) and is determined using a variety of techniques in various embodiments. In various embodiments, the buffer size is determined at least in part by one or more of the following: a multiple of the expected rate of change; a percentage of the size of the computed size for portion 902; a known, observed, estimated, and/or otherwise anticipated degree of variability in the rate of change; and an amount of time expected to be required to perform reclamation process to make space at a tail end of the protection window available for reuse.

In this example, previous version data is written contiguously within data region 900. Writing begins at the beginning of portion 902 and goes sequentially or contiguously from left to right in this example. When the end of portion 902 is reached, buffer 904 is then written to from left to right. For example, the next location that will be written to is location D10.

In some embodiments, buffer 904 is used to relax a timing constraint and/or permit additional processing delay when reclaiming (e.g., physically and/or virtually) locations in storage. For example, when the end of portion 902 is reached, previous version data is written to buffer 904 and the beginning of portion 902 does not need to be immediately and/or quickly reclaimed. The size of buffer 904 is determined in any appropriate manner. For example, in some embodiments, the size of buffer 904 varies in accordance with the size of portion 902. In some embodiments, buffer 904 is a fixed or programmable size. In some embodiments, the journal logger is told it has been allocated the data region 900, and is not told that the data region 900 includes a portion 902 and buffer 904. The journal logger writes to successive locations in data region 900 without regard to whether a particular space is in the portion 902 or buffer 904.

Virtual reclamation is triggered in this example when buffer 904 is written to. That is, while writing to portion 902, virtual reclamation is not performed (i.e., virtual reclamation pointer 906 is located to the left of location D0 in data region 900), because initially the time period for which previous version data has been captured is shorter than the desired protection window. In this example, virtual reclamation pointer 906 is used to track or otherwise note the portion of data region 900 that is virtually reclaimed. A physical reclamation pointer 907 marks the point beyond (i.e., to the left of, in the example shown) which storage locations have been physically reclaimed (i.e., made available for reallocation and reuse) and the position of physical reclamation pointer 907 corresponds to a baseline time associated with data stored in snapshot region 908. The part of data region 900 that lies between the physical reclamation pointer 907 and virtual reclamation pointer 906 comprises storage locations that have been virtually reclaimed but not yet physically reclaimed. As additional storage is virtually reclaimed, virtual reclamation pointer 906 moves to the right and storage located to the left of reclamation pointer 906 has been virtually reclaimed. In some embodiments, the virtual reclamation pointer is moved to the right at times and amounts determined at least in part by the size and/or frequency of writes by the journal logger at head 909. Should a user request access to or restoration of a prior version that includes one or more blocks to the left of virtual reclamation pointer 906, that access or restoration is not permitted. In some embodiments, some other tracking technique is used besides a reclamation pointer.

In some embodiments in which the virtual reclamation pointer is moved based at least in part on the size of writes at the head, large writes at the head may result in constriction of the size of the protection window as a result of correspondingly large portions of storage at the tail end, written in smaller chunks and/or with less frequent writes of a large size, being virtually reclaimed. In some embodiments, such potential unpredictability of the size (in time) of the protection window is tolerated to ensure that sufficient space is available to store the most recent and presumably more critical data. In some embodiments, the virtual reclamation pointer is moved based on time, to ensure the full protection window is always provided. In some such embodiments, extra space is included in the data region to accommodate bursts of activity such as large and/or frequent writes at the head.

In some embodiments, storage locations are virtually reclaimed in a contiguous fashion. That is, in some embodiments two portions of storage that are virtually reclaimed cannot be separated by a portion that is not virtually reclaimed; in some alternative embodiments this is permitted. In some applications it is desirable to ensure that virtual reclamation keeps up with new previous version data that is being written but not necessarily delete older data if it is not necessary. Therefore, in some embodiments, the amount of storage that is virtually reclaimed is at least as much as the amount of new previous version data that is being written (e.g., to buffer 904). For example, if locations D10 and D11 are written, reclamation pointer 906 correspondingly advances by at least two locations. In some embodiments, all locations associated with a given time or metadata record are virtually reclaimed if at least one location for that time or metadata record is virtually reclaimed. For example, in some embodiments, in the example shown in FIG. 9A it is not permitted to virtually reclaim location D2 without also virtually reclaiming D3, because both are related to the same metadata record 916. In some embodiments, a check is performed before a location or range of locations is virtually reclaimed. For example, a check may be to determine if an access or restore is being performed using a location that is being considered for virtual reclamation.

In some embodiments, storage is not necessarily reclaimed in a contiguous fashion. For example, the number of reclamation pointers in some embodiments changes over time (e.g., goes from one reclamation pointer to two and back to one).

Figure 9B:
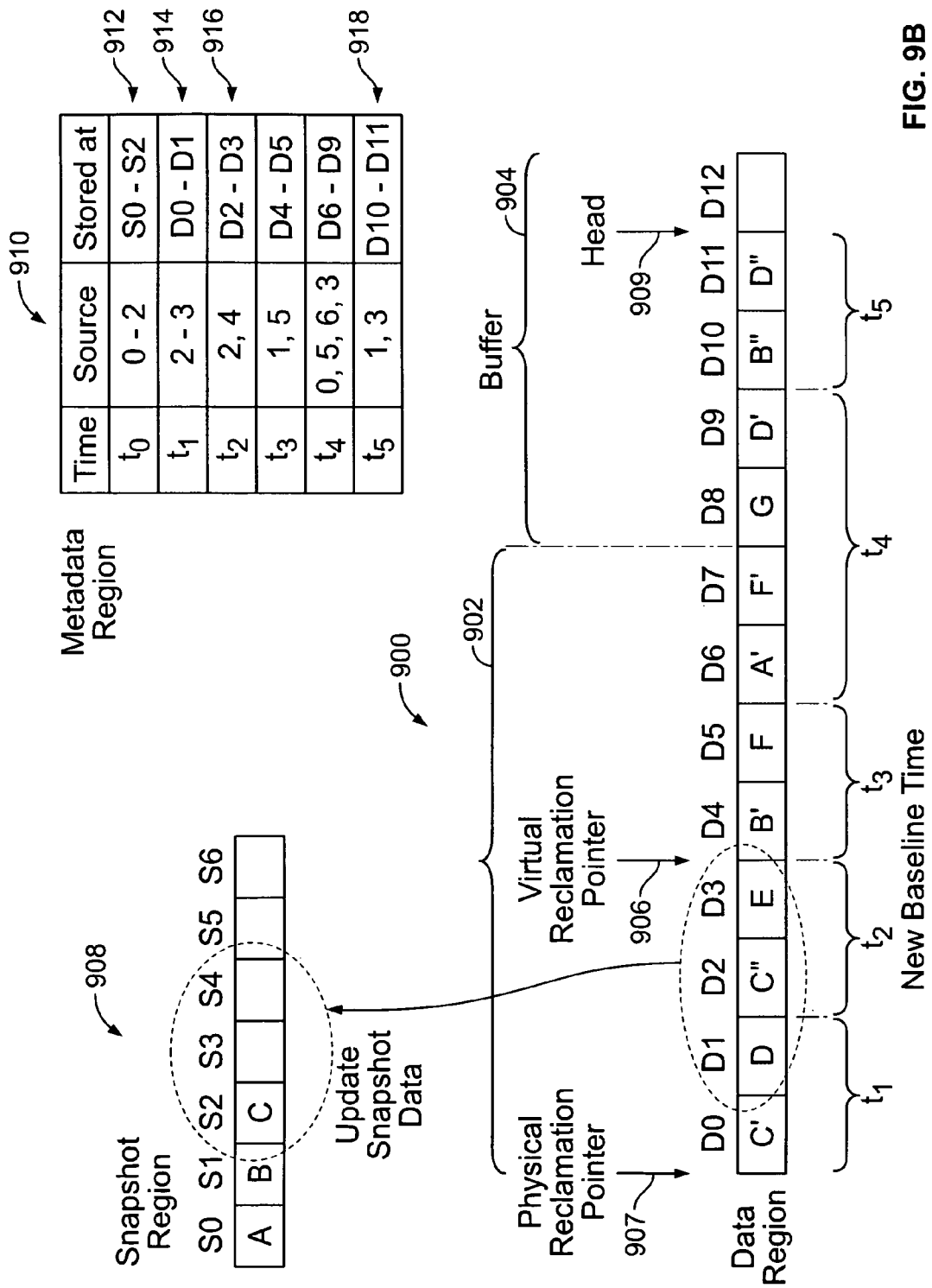
FIG. 9B is a diagram illustrating an embodiment of physically reclaiming storage locations that have been virtually reclaimed.

FIG. 9B is a diagram illustrating an embodiment of physically reclaiming storage locations that have been virtually reclaimed. In the example shown, physical reclamation trails virtual reclamation; that is, physical reclamation is performed on locations that have been virtually reclaimed. FIG. 9B illustrates a point in time some time after that shown in FIG. 9A. Two new blocks are intercepted at time t5, and the values B" and D" are stored in locations D10 and D11, respectively, of data region 900. Metadata record 918 corresponds to time t5 and has been added to metadata region 910. Protection window head 909 has advanced to just after D11, and virtual reclamation pointer 906 has advanced two locations, i.e., by an amount of storage corresponding to the size of the writes at the head at t5.

In some embodiments, physical reclamation comprises two sub-processes: updating a snapshot and deleting (or deleting one or more references to) obsolete data. To update a snapshot, previous version data is moved or copied from data region 900 to snapshot region 908. In the example shown, block locations D0-D3 in data region 900 are being physically reclaimed. Snapshot data stored in snapshot region 908 is updated from time t0 to time t2. The values C", D and E (in locations D2, D1, and D3, respectively) are moved or copied to snapshot region 908.

In the example shown, the time up to which physical reclamation is to be performed is the time associated with the current location of virtual reclamation pointer 906, i.e., time t2. In other circumstances and/or embodiments, a time to the left of the virtual reclamation pointer 906 may be selected. For example, a time to the left of the virtual reclamation pointer 906 may be selected to define a contiguous range of locations for physical reclamation without including a location not available for physical reclamation, such as one locked because it is associated with a "mount point" defined to at least potentially restore or otherwise access a previous version with which the data stored in the locked location is associated.

In some embodiments, physical reclamation includes determining a block map. Referring to the example figure, in such embodiments a block map associated with time t2 is determined. This enables the subsequently superseded data in D0 (i.e., C', superseded by C" in D2) to be ignored, avoiding multiple writes to the same location in snapshot region 908 for the same physical reclamation operation. That is, by determining a block map for time t2 and only writing to snapshot region 908 the most recent (as of t2) version of each block that has changed since the prior snapshot update (at t0 in the example shown in FIG. 9B). In the example shown in FIG. 9B, the block map for time t2 would show the then current data for source blocks 0-1 to be A and B, stored at S0 and S1, respectively; and for source blocks 2, 3, and 4 to be C", D, and E, respectively, stored at D2, D1, and D3, respectively.

In some embodiments, a physical reclamation algorithm walks the range of storage locations in the area to be physically reclaimed, in linear sequence starting at the left, and for each either ignores it if the location is not in the block map (e.g., D0) or moves the associated data to a corresponding location(s) in the snapshot region 908 if it is in the block map (e.g., D1-D3), after which the locations in the reclaimed region are erased (in some embodiments) and/or one or more references (e.g., in an index and/or metadata) to such locations are removed, after which the reclaimed locations are considered available to be reallocated, e.g., in response to a request from a journal logger for more space, e.g., because the journal logger has reached or is nearing the end of a previously allocated range of storage locations. In some embodiments, a physical reclamation pointer (not shown) is advanced as the last step in a physical reclamation process.

Figure 9C:
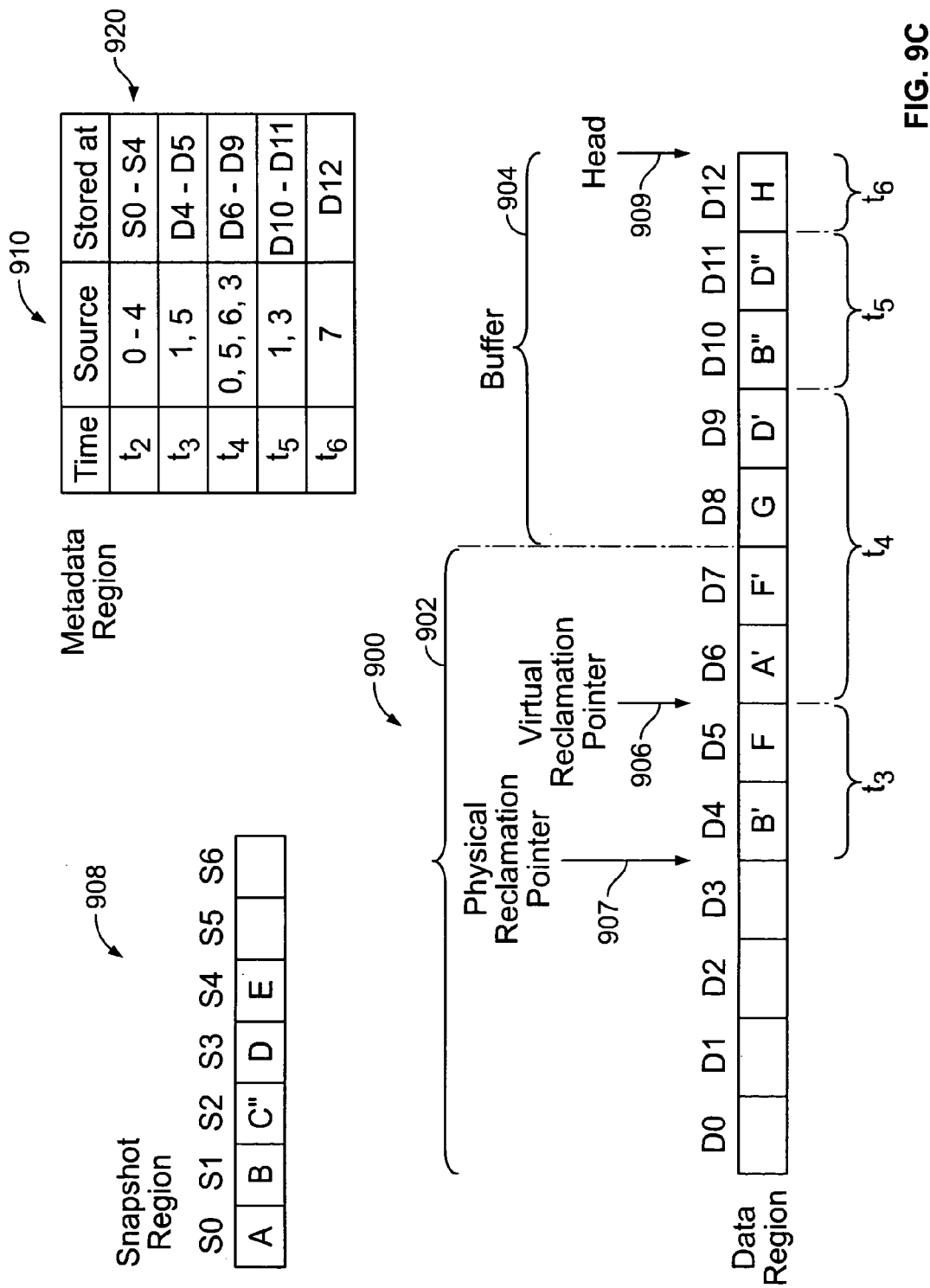
FIG. 9C shows the state of the various storage locations and data structures once locations D0-D3 have been reclaimed.

FIG. 9C shows the state of the various storage locations and data structures once locations D0-D3 have been reclaimed. In the example shown metadata region 910 has been modified to reflect the snapshot update. In this example, metadata records 912-916 have been replaced with a single entry indicating time t2, source 0-4, and storage locations S0-S4.

In this example, the values D, C", and E are stored in locations S2-S4, respectively. That is, in some embodiments, placement is not necessarily maintained with respect to a snapshot region. In some embodiments, placement is maintained with respect to a snapshot region (e.g., so that the value C" replaces the value C in location S2 of snapshot region 908). The values A and B in locations S0 and S1 of snapshot region 908 are maintained. In some such embodiments, an index, metadata table, and/or other dynamically updated structure or mapping is used to track which locations in snapshot region 908 correspond to which blocks of the protected entity.

In the example shown, the locations D4 and D5 have been virtually reclaimed since the example of FIG. 9B. In this embodiment, storage is virtually reclaimed in response to or based on new data that is written by head 909. A single block value, H, is written to block location D12 by head 909 and a new metadata record is added to metadata region 910. In this embodiment, all blocks associated with a given time are virtually reclaimed if at least one block associated with that time is reclaimed. So, since location D4 is virtually reclaimed, all blocks associated with time $t_3$ are virtually reclaimed in this embodiment and virtual reclamation pointer 906 advances to the right of location D5. In some embodiments, physically reclaimed locations in storage (e.g., locations D0-D3) are reallocated and head 909 wraps around to location D0.

In some embodiments, a snapshot is updated by updating a list or other record used to track snapshot data. For example, there may be a list of the locations of snapshot data. Using the example shown in FIGS. 9B and 9C, in some embodiments such as list is modified from (<location of value A>, <location of value B>, <location of value C>) to (<location of value A>, <location of value B>, D2, D1, D3). In some embodiments, an additional field (not shown) is included in each metadata record in metadata region 910 is used to track updates to the snapshot. In some cases, only some blocks associated with a given metadata record are associated with a snapshot and the additional field used to track snapshot data is capable of dealing with this scenario. For example, there may be one bit in a snapshot tracking field for each block associated with a given metadata record.

Physical reclamation in some embodiments includes deleting or removing data that is obsolete or is otherwise no longer needed. For example, the values C', D, C", and E stored in locations D0-D3 have been erased in the example shown in FIGS. 9B and 9C. In some embodiments, the data are not (necessarily) erased immediately and instead a reference (e.g., in an index, metadata, etc.) associated with them is removed and/or modified.

Metadata records are updated as needed to reflect the removal or erasure of obsolete data. For example, in the example shown in FIGS. 9B and 9C metadata records 912-916 have been replaced in metadata region 910 with a single entry 920, since the blocks associated with those metadata records have either been included in new entry 920 (e.g., the values C", D, and E have been added to metadata record 912) or are no longer needed (e.g., value C').

In some embodiments, a determination whether or not to physically reclaim storage and/or a determination regarding what locations to physically reclaim is performed to ensure that the portion of storage being considered for physical reclamation is not being accessed or restored. In some embodiments, locations associated with a previously-requested restore are locked and cannot be reclaimed until unlocked. In some such embodiments, if the data has to be retained for a prolonged period, it is moved to another location to enable physical reclamation of the original location, e.g., as part of a contiguous range of locations. In some embodiments, storage is physically reclaimed in units that is the same or is a factor of a larger unit in which storage locations are allocated (e.g., an allocation group). In some embodiments, storage is physically reclaimed in units that are the same as or an integer multiple of an allocation unit that is based at least in part on the size of writes to the data region, e.g., by a journal logger (e.g., a multiple of cluster size), which units are smaller than a larger unit (e.g., number of contiguous locations) in which storage is allocated (e.g., an allocation group). In some such embodiments, contiguous sets of reclaimed storage locations are aggregated prior to being reallocated so that storage locations reclaimed in the smaller units can be allocated in the larger unit (e.g., an allocation group). In some embodiments, storage is physically reclaimed in a contiguous manner. In some embodiments, there is no rule to physically reclaim storage in a contiguous fashion.

As described above, in some embodiments, storage is virtually reclaimed in one or more units of measurement. In some embodiments, this unit is an allocation unit. In some embodiments, storage is physically reclaimed in one or more units; this unit may or may not be the same as that used for virtual reclamation. In some embodiments, storage is virtually reclaimed in groups of one or more allocation units but is physically reclaimed in groups of one or more allocation groups. An allocation group may be, for example, 64 KB and an allocation unit may, for example, be 4 KB. As noted in the preceding paragraph, in some embodiments storage is physically reclaimed in groups of one or more allocation units but reclaimed groups are aggregated to enable reclaimed space to be reallocated as a larger, contiguous allocation group of locations.

In some embodiments, techniques are used to optimize or otherwise improve performance associated with virtual reclamation and/or physical reclamation. For example, in some embodiments, non-contiguous reclamation is permitted during virtual and/or physical reclamation. In some embodiments, compaction or de-fragmentation is performed, where scattered pieces of data are gathered together and moved to a contiguous location in storage.

Figure 10:
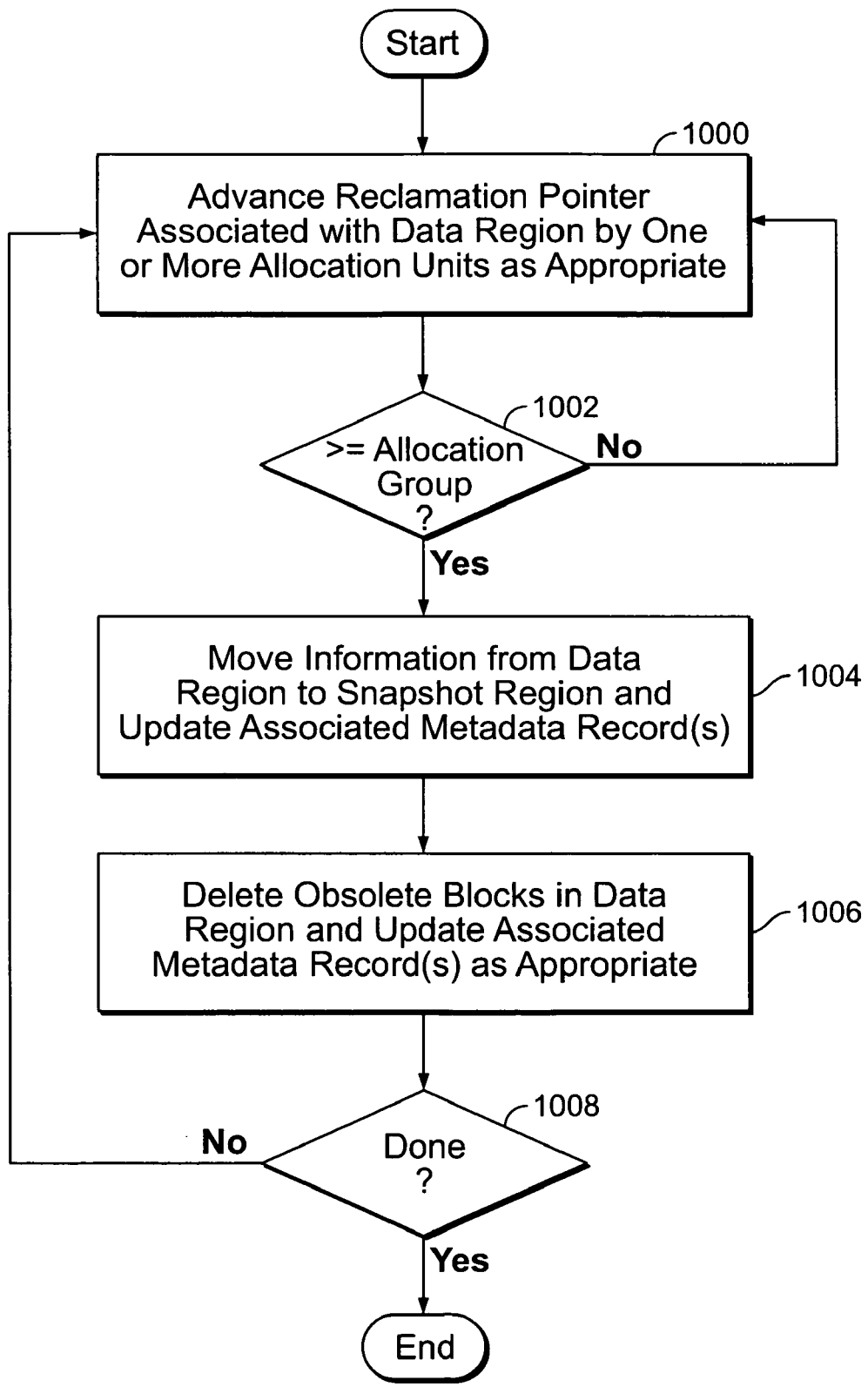
FIG. 10 is a flowchart illustrating an embodiment of a process for reclaiming storage.

FIG. 10 is a flowchart illustrating an embodiment of a process for reclaiming storage. In the example shown, storage is virtually reclaimed in one or more allocation units and is physically reclaimed in one or more allocation groups. In some embodiments other units are used besides allocation units and/or allocation groups. In this example, step 1000 is associated with virtual reclamation and steps 1004 and 1006 are associated with physical reclamation.

At 1000, a reclamation pointer associated with a data region, e.g., a virtual reclamation pointer, is advanced by one or more allocation units as appropriate. In various embodiments, various decisions are used in determining whether to advance a reclamation pointer and/or the number of allocation units to advance a reclamation pointer by. In some embodiments, a reclamation pointer is advanced an amount that is greater than or equal to a group of one or more block writes recently written to the data region. For example, if a group of eight block writes are intercepted and stored in a data region, this may cause a reclamation pointer to advance by at least eight blocks.

It is decided at 1002 whether there is greater than or equal to an allocation group. For example, an allocation group may be 64 KB and it may be determined whether there is at least 64 KB worth of virtually reclaimed storage. In some embodiments, physical reclamation is performed contiguously. If there is strictly less than an allocation group, a reclamation pointer is advanced as appropriate at 1000.

Otherwise, at 1004, information is moved from a data region to a snapshot region and associated metadata record(s) are updated. In some embodiments, location is maintained so that an older value (e.g., C) is overwritten or otherwise replaced with a newer, corresponding value (e.g., C"). In some embodiments, writing is performed in a manner that minimizes or reduces access time associated with reading (e.g., from a data region) and/or writing (e.g., to a snapshot region). For example, storage is read or written in a strictly increasing/decreasing manner to minimize or reduce head seeks.

In some embodiments, at 1004 data is moved from the data region to the snapshot region, and associated metadata and/or index entries updated, in a manner that does not require atomic access to or atomic operations associated with continuous protection functionality, data, and/or resources. In some embodiments, atomic in this context means that no two unit steps need to be clubbed together to form one atomic step for the process to be successful. For example, each step can be taken without fear of being pre-empted or swapped out and leaving an inconsistent state. An embodiment is described in further detail below.

At 1006, obsolete blocks in a data region are deleted and associated metadata record(s) are updated as appropriate. In some cases, deleting at 1006 overlaps with or is performed prior to moving data at 1004. Steps 1004 and 1006 in various embodiments are performed at a variety of times with respect to each other.

In some embodiments, additional and/or alternative processing is performed than in the example described above. For example, in some embodiments, prior to updating a snapshot at 1004, a check is performed to ensure that a portion of storage being evaluated for physical reclamation is not being accessed or restored. In some embodiments, if there is an access/restoration event going on, steps 1004 and/or 1006 are not performed until access or restoration concludes.

It is determined at 1008 whether a process is done. In some embodiments, a process concludes when continuous data protection ends. In some embodiments, if the end of a data portion is reached in the reclamation process, the "tail" of the protection window (e.g., the location of the virtual reclamation pointer, in the example shown in FIGS. 9A-9C), wraps around to the left boundary of the data region and reclamation of regions earlier in time than the tail continues as the virtual reclamation pointer continues to advance (e.g., performed at step 1000).

Figure 11:
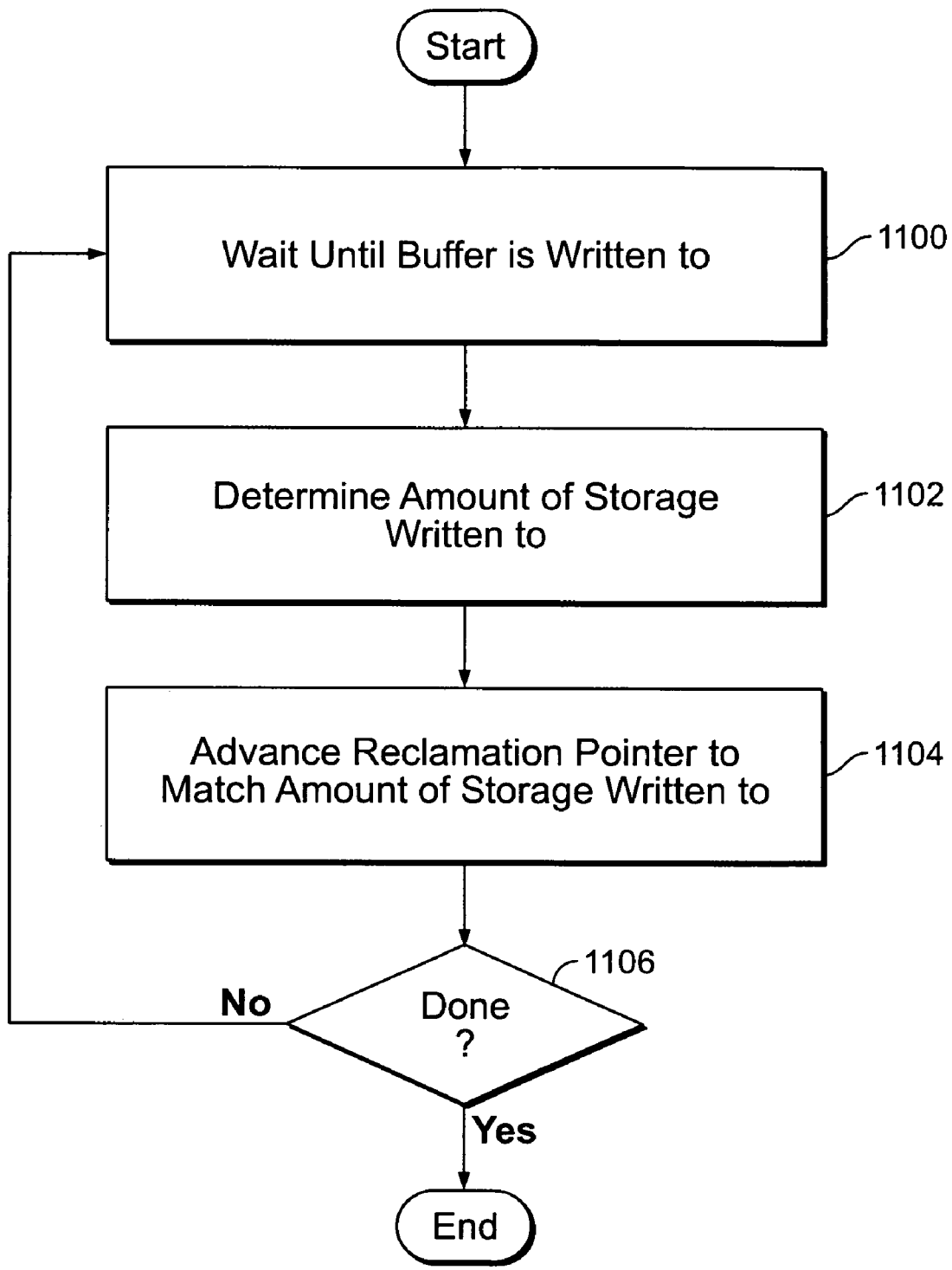
FIG. 11 is a flowchart illustrating an embodiment of a process to advance a reclamation pointer.

FIG. 11 is a flowchart illustrating an embodiment of a process to advance a reclamation pointer. In the example shown, the process is used to virtually reclaim storage. In some embodiments, the example process is used at 1000 to advance a reclamation pointer. In some embodiments, the example process is performed by a version store associated with a CDP server.

At 1100, there is a wait until a buffer is written to. For example, in FIG. 9A, virtual reclamation does not begin until buffer 904 is written to. At 1102, an amount of storage written to is determined. For example, if a group of four blocks is intercepted and written to a buffer, the amount of storage written is four blocks.

At 1104, a reclamation pointer is advanced to match the amount of storage written to. In some embodiments, the reclamation pointer is a virtual reclamation pointer. In some embodiments, a (e.g., virtual) reclamation pointer is advanced exactly the same amount as the amount determined at 1102. In some embodiments, a reclamation pointer is advanced at least the same amount as the amount determined at 1102. In some embodiments, a reclamation pointer is advanced so that all blocks or locations associated with a given time or metadata record are virtually reclaimed together (e.g., in the example of FIGS. 9A and 9B, reclamation pointer 906 is not permitted to be located between D2 and D3, D4 and D5, etc.).

It is determined at 1106 whether a process is done. In some embodiments, a process is done when a reclamation pointer reaches the end of a data portion (e.g., in FIG. 9B, reclamation pointer 906 is located to the right of D12). In some embodiments, a process does not done until continuous data protection ends.

Figure 12:
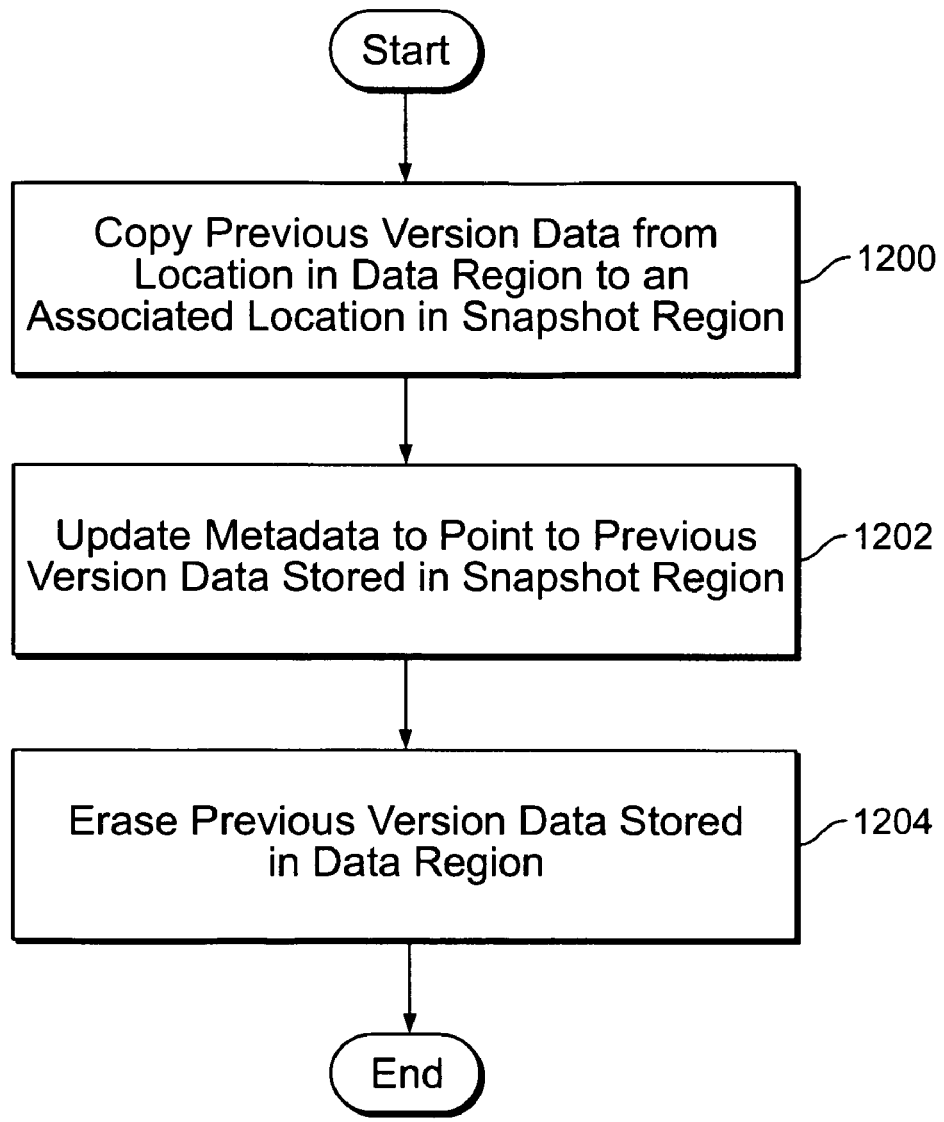
FIG. 12 is a flowchart illustrating an embodiment of a process to move previous version data from a data region to a snapshot region and update metadata records affected by the move.

FIG. 12 is a flowchart illustrating an embodiment of a process to move previous version data from a data region to a snapshot region and update metadata records affected by the move. In the example shown, this is performed in a manner that does not require atomic access to continuous protection functionality, data, and/or resources. In some embodiments, the example process is used at 1004 during physical reclamation.

At 1200, previous version data is copied from a location in a data region to an associated location in a snapshot region. In this example, this results in the same data being stored in both the data region and in the snapshot region. In some embodiments, an index and/or metadata associated with previous version data being moved initially still points to the original location in the data region. As a result, in such embodiments a restore or other operation requiring access to the data (e.g., that is performed prior to the index and/or metadata being updated) will be serviced using the copy of the previous version data as it is stored in the data region.

At 1202, metadata is updated to point to previous version data stored in a snapshot region. In various embodiments, a metadata record is created, modified, and/or deleted as needed. In some embodiments, an index or other data structure used to make a search more efficient (e.g., in the event of a restore) is updated as well.

Previous version data stored in a data region is erased at 1204. For example, once metadata has been updated, the previous version data stored in the original location is erased and/or those locations in the data region are made available to be reallocated. By updating snapshots in this manner, a user or process seeking to restore data does not necessarily need to wait for an atomic operation to move the previous version data from the data region to the snapshot region and/or no logic or locking mechanism is required to be provided to ensure atomic access to the data. For example, if a restore or access request is serviced while the metadata is pointing to the previous version data stored in the data region, that information is still available since it has not yet been erased. Similarly, if a restore or access request is serviced after the metadata is updated, there is previous version data in the snapshot region that is being pointed to by the metadata region. In some cases this prevents or reduces the likelihood of incorrect data being read from invalid locations in storage.

Figure 13:
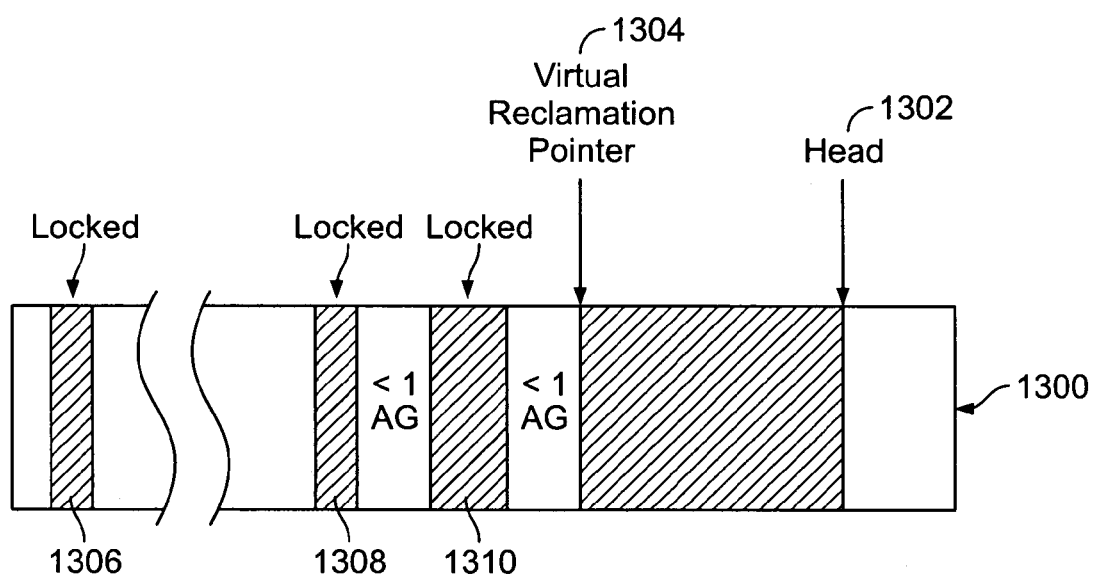
FIG. 13 is a block diagram illustrating an embodiment of a storage used to store previous version data.

FIG. 13 is a block diagram illustrating an embodiment of a storage used to store previous version data. In some embodiments, the data space 1300 comprises storage locations allocated for use by a continuous data protection or other journaling process to store writes made to a protected data set, sometimes referred to as a protected entity. Writes to the protected entity are intercepted and a copy of each write made at a corresponding location in data space 1300, with the write head 1302 indicating the location at which the next write is to be stored. A virtual reclamation pointer 1304 represents the tail of a rolling window of continuous data protection, within which a user is able to restore at a write-by-write granularity. To the left of virtual reclamation pointer 1304 in the example shown in FIG. 13, storage locations outside the rolling protection window in some embodiments would normally be considered eligible for reclamation and subsequent reallocation to the journaling process, e.g., once an end of the data space 1300, or a buffer or overflow region, is reached, as described above. However, in the example shown, writes stored in storage locations 1306, 1308, and 1310 have been "locked", as described more fully below, to prevent those locations from being reclaimed.

In various embodiments, the need to lock storage locations such as the locked storage locations 1306, 1308, and 1310 of FIG. 13 may arise because a user mounted a "restore point" corresponding to a time and/or state of the protected entity at which time and/or state the previous version data stored in the locked locations 1306 was stored in corresponding locations in the protected entity. If the restore point is not unmounted, the corresponding previous version data must be retained even after the tail of the rolling protection window, represented in this example by virtual reclamation pointer 1304, moves past the storage locations in which the previous version data associated with the restore point are stored in the data space 1300. In some embodiments, previous version data may be retained beyond the continuous data protection window to make available for earlier periods one or more restore points at a granularity other than write granularity, e.g, hourly, daily, weekly, etc., depending on how far back a user wants to go and/or administrators configure the system/application to provide.

In some cases, depending on the size and frequency of writes to the protected entity, which data blocks in the protected entity are updated over time, etc., locking storage locations such as locations 1306 in the example shown may leave gaps that are smaller than an optimal and/or desired allocation group size that in some embodiments represents the minimum size block of contiguous storage locations desired to be allocated to the journaling process, e.g., to optimize the writing of previous version data to the data space.

Compacting and/or relocating stored previous version data to facilitate efficient reclamation and reallocation of data space storage locations is disclosed. In the example shown in FIG. 13, for example, in various embodiments one or more of the locked regions 1306, 1308, and 1310 would be copied to a new location adjacent to another one of the location, or to a temporary location not in the data space intended for use by the journaling process, to create contiguous ranges of storage locations of at least an allocation group in size. In the example shown, for example, in some embodiments the data stored in regions 1306 and/or 1310 would be moved to locations adjacent to region 1308 if it were determined that doing so would make it possible to reclaim and reallocate continuous ranges of storage at least one allocation group in size on either side of the compacted locked storage regions. In some embodiments, if moving the data stored in region 1310 to the left, adjacent to region 1308, would not leave at least one allocation group worth of reclaimable space to the right of the compacted locked regions, the data in regions 1308 and 1310 would be moved to storage locations adjacent to region 1306 and/or all three regions copied to temporary storage outside the data space 1300, depending on the embodiment, circumstances, user and/or administrator indicated preferences, etc.

Consolidating and/or relocation previous version data to enable storage locations in data space to be reclaimed, reallocated, and/or reused efficiently is disclosed. In various embodiments, consolidation and/or relocation may occur prior to the previous version data and/or associated writes and/or metadata records being effectively "locked", after locking, or during the locking process.

Figure 14:
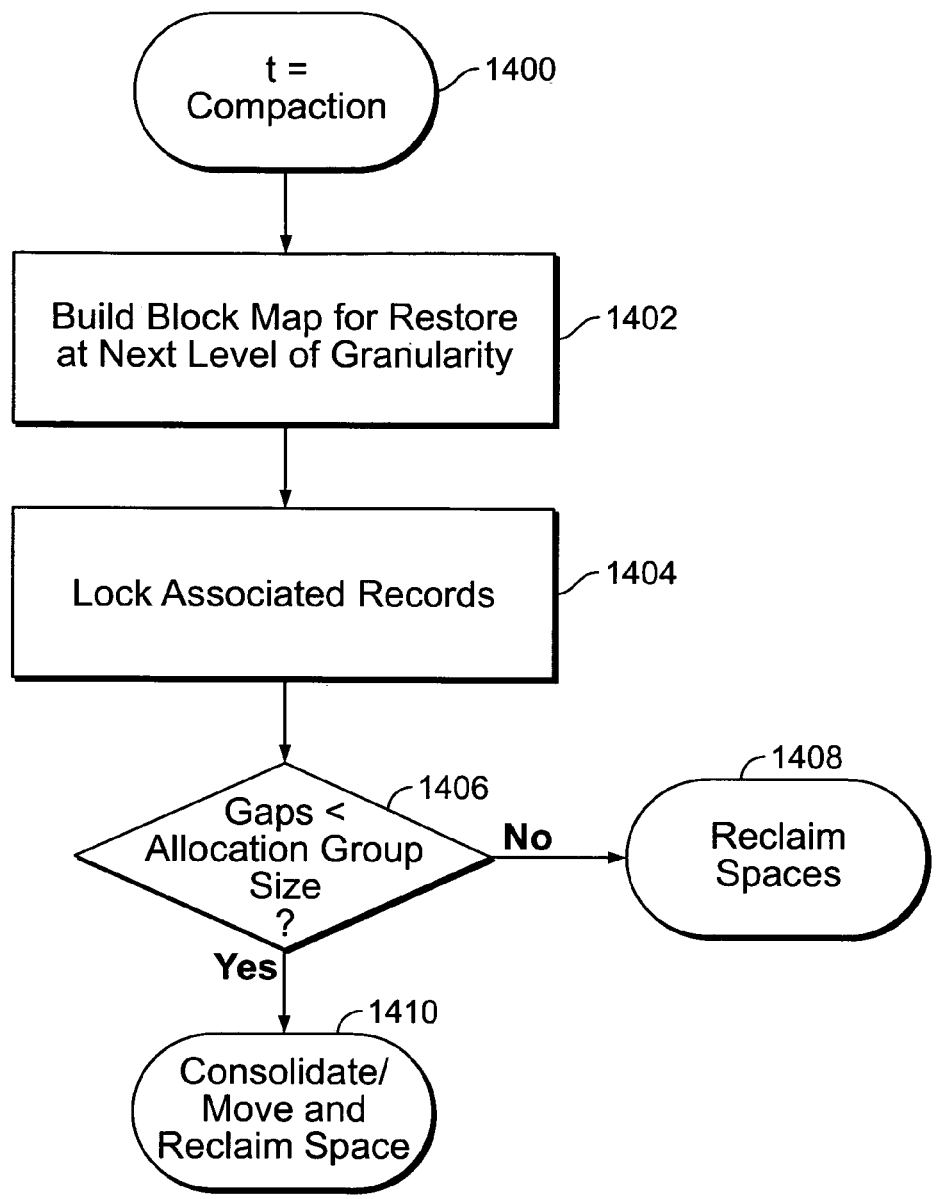
FIG. 14 is a flow chart illustrating an embodiment of a process for reclaiming data space in allocation group size continuous ranges of locations.

FIG. 14 is a flow chart illustrating an embodiment of a process for reclaiming data space in allocation group size continuous ranges of locations. In the example shown, restore points at configured or configurable levels of granularity are stored and made available for periods prior to a current continuous data protection window, and associated previous version data is consolidated or moved, as appropriate and required, to enable space to be reclaimed, reallocated, and used by a journaling process efficiently. An indication is received that a time to evaluate the need to perform compaction has arrived (1400). In some embodiments, the indication includes an indication that a pointer, such as virtual reclamation pointer 1304, has advanced by a prescribed amount (e.g., of time) beyond a last (hourly, daily, etc.) restore point. A block map for a next restore point and/or a restore point at a next level of granularity (e.g., consolidating hourly restore points from a prior day to a single daily restore point for that day, e.g., the end of the business day (1402). In some embodiments, the block map includes for each source block in the protected entity (or at least for each source block in which data was stored at a time with which the restore point is associated) an identification of storage blocks in the data space, such as data space 1300, in which the previous version data that was stored in those source blocks at the restore point time (or other state) is stored. The data space storage blocks included in the block map built at 1402 are locked (1404). In some embodiments, storage locations are locked by including associated metadata records in a map or other stored identification of metadata records associated with the restore point. It is determined whether the gaps, if any, between the ranges of storage locations in data space that have been locked because they contain previous version data associated with the restore point are smaller than one allocation group in size (1406). If there are no gaps or all gaps are at least as large as one allocation group, any space not locked, including any gaps, is reclaimed. Otherwise, previous version data in the locked regions is consolidated and/or moved to temporary storage outside the data space prior to reclaiming space in allocation group or larger ranges (1410). In various embodiments, whether previous version data is consolidated or moved depends, for example, on the circumstances (e.g., data is consolidated if doing so leaves only space reclaimable in chunks at least one allocation group in size and moved to temporary storage if allocation group size reclamation and reallocation is not achievable by consolidation within the data space), configuration/settings (e.g., user or administrator preference), availability of sufficient temporary storage, etc.

Figure 15:
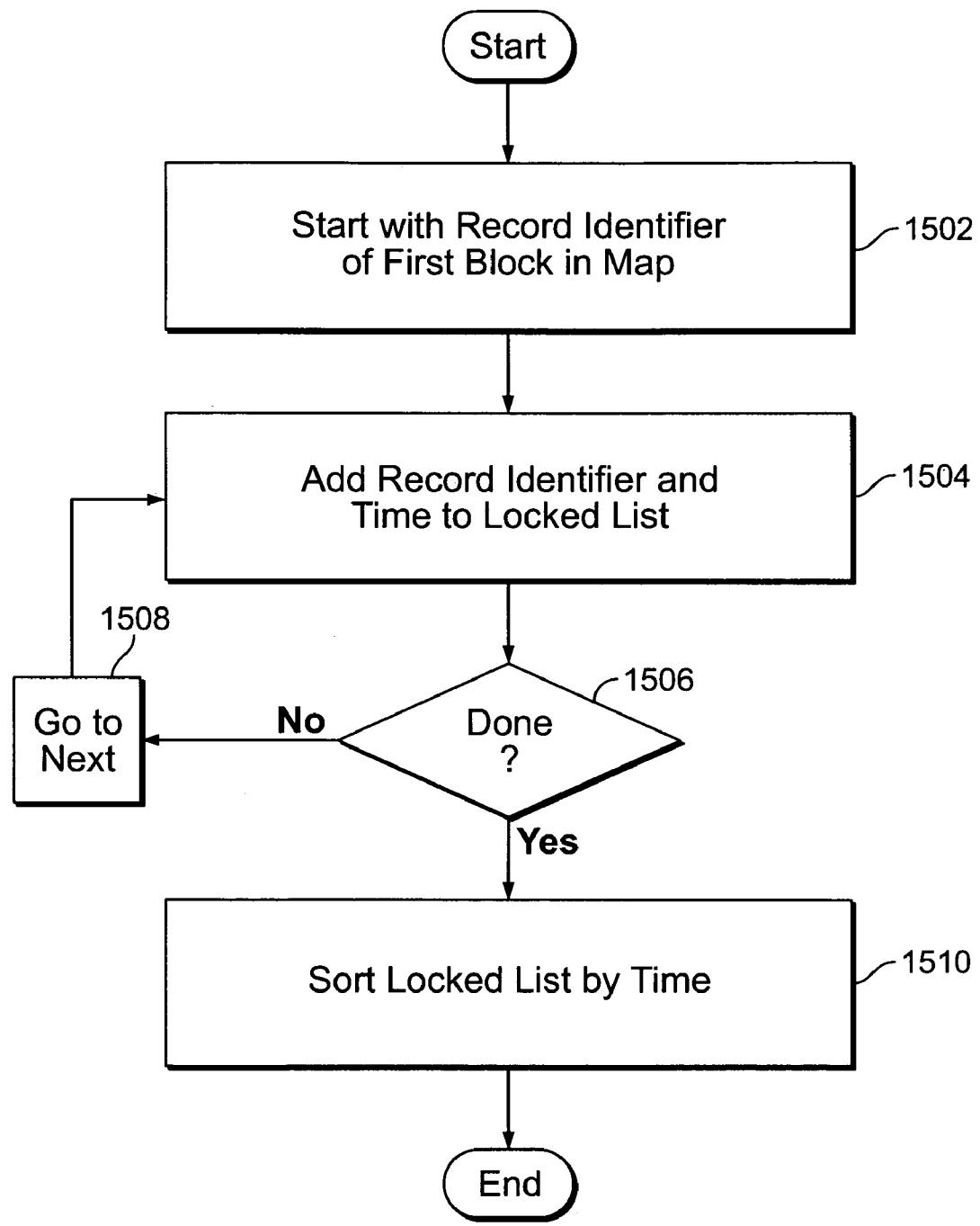
FIG. 15 is a flow chart illustrating an embodiment of a process for locking storage locations in a data space used to store previous version data.

FIG. 15 is a flow chart illustrating an embodiment of a process for locking storage locations in a data space used to store previous version data. In some embodiments, the process of FIG. 15 is used to implement 1404 of FIG. 14. In the example shown, storage locations in data space are locked by including associated metadata records in a map or other identification of metadata records that point to previous version data associated with a restore point with which the map is associated. Starting with a first metadata record used to add a first group of data space blocks to a block map associated with the restore point, e.g., because previous version data in at least some of those data space blocks is associated with the restore point, a record identifier and associated write time are added to the map or other identification of "locked" records (1504). In some embodiments, the record identifier includes an identification of a physical device and a specific location on that device in which the corresponding metadata record is stored. 1504 is repeated for each metadata record associated with previous version data that is associated with the restore point (1506 and 1508). Once all applicable metadata records have been added to the record identifier map (also referred to in FIG. 15 as the "locked list"), the identifiers in the map are sorted by time (1510), after which the process ends.

Figure 16A:
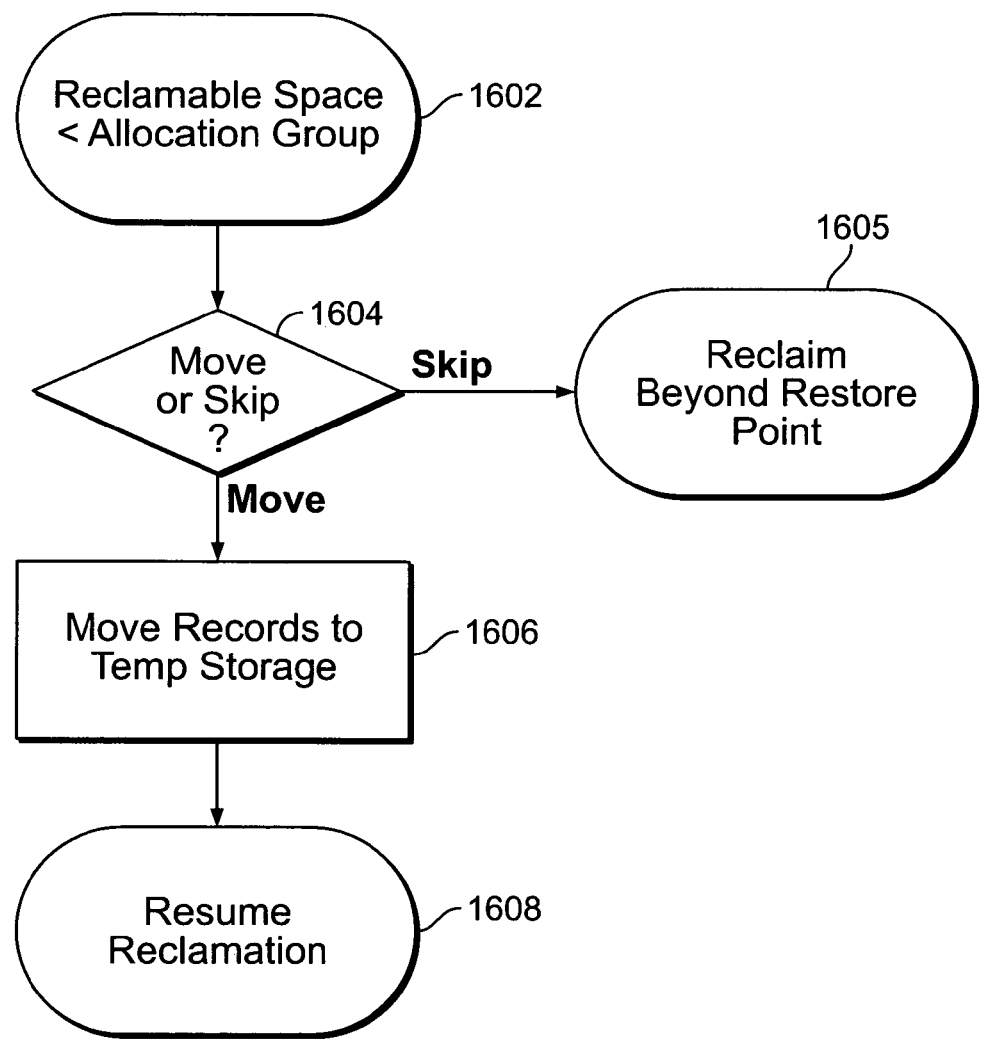
FIG. 16A is a flow chart illustrating an embodiment of a process for reclaiming space if an otherwise reclaimable segment that is smaller that one allocation group is encountered.

FIG. 16A is a flow chart illustrating an embodiment of a process for reclaiming space if an otherwise reclaimable segment that is smaller that one allocation group is encountered. In some embodiments, the process of FIG. 16A is implemented in a system that enables an administrator or other authorized user to indicate a preference for whether the system should respond to gaps smaller than one allocation group in size by either skipping ahead to the next reclaimable segment, e.g., to a point beyond the last write associated with a mounted restore point, or should instead consolidate/move locked records to temporary storage to create a reclaimable space of at least one allocation group. If a segment of reclaimable space that is smaller than one allocation group is encountered (1602), it is determined whether such segments are to be skipped or previous version data moved if possible to create a segment at least one allocation group in size (1604). If the system is configured to skip segments (e.g., gaps) smaller than one allocation group, reclamation resumes beyond the restore point, i.e., beyond the last write associated with the restore (1605). In some embodiments, the last write associated with the restore point is determined by accessing a map or list of locked metadata records associated with the restore point and reading a last entry in the time-sorted list of records. In some embodiments, reclamation beyond the restore point is implemented by creating a new instance of a virtual reclamation pointer, such as virtual reclamation pointer 1304 of FIG. 13, at a point beyond the last write associated with the restore point. In some embodiments, the original virtual reclamation pointer continues to advance and is or may be used upon un-mounting of the restore point to determine which, if any, of the storage locations previously locked to preserve restore point data should be reclaimed and reallocated. In various alternative embodiments, instead of moving all the way to the end of a restore point upon encountering a gap smaller than an allocation group, one or more of the following occurs: A next gap associated with the restore point is checked (e.g., after locked region 1308 in FIG. 13, if it is determined that the gap between regions 1306 and 1308 is less than one allocation group), a new instance of the virtual reclamation pointer is created at the beginning of a next gap associated with the restore point, and/or all gaps associated with the restore point are added together to determine whether in aggregate they represent at least one allocation group. In the latter case, in some embodiments if the sum of the gaps together equals at least one allocation group, the previous versions data is consolidated into a contiguous range of storage locations, leaving the at least one allocation group as a contiguous range of reclaimable space, which is then reclaimed. In the example shown in FIG. 16A, if the system has been configured to consolidate/move previous version data (1604), one or more sets of previous version data (writes, each identified by an associated metadata entry in a map or list of locked records) are consolidated as described above or moved to temporary storage, if available and so configured (1606), and reclamation of the resulting contiguous range of reclaimable storage locations resumes (1608).

Figure 16B:
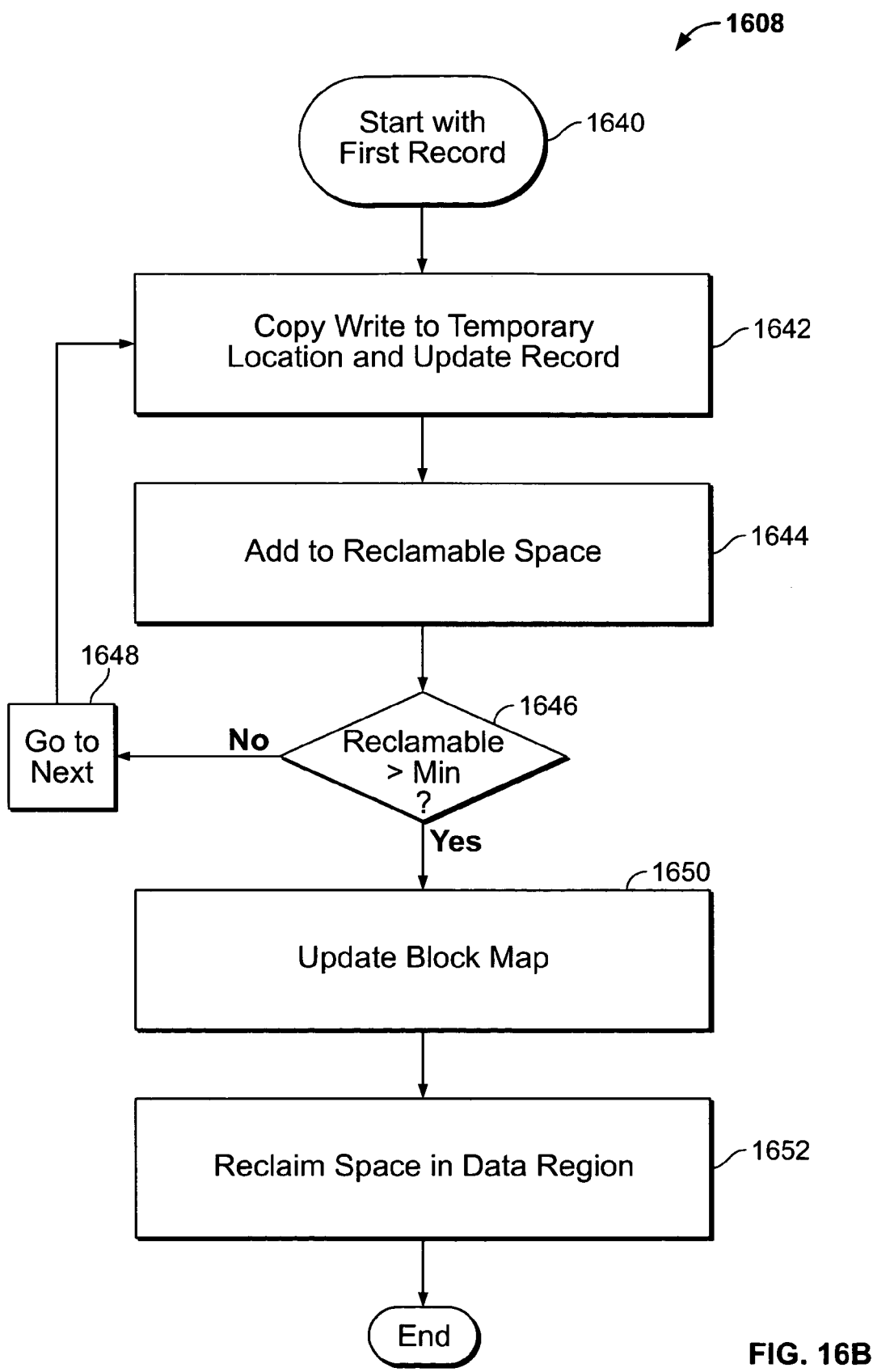
FIG. 16B is a flow chart illustrating an embodiment of a process for moving previous version data to temporary storage to create a contiguous range of reclaimable space that is at least one allocation group in size.

FIG. 16B is a flow chart illustrating an embodiment of a process for moving previous version data to temporary storage to create a contiguous range of reclaimable space that is at least one allocation group in size. In some embodiments, the process of FIG. 16B is used to implement 1608 of FIG. 16A. In the example shown, starting with a first locked record (write) at the end of a gap (reclaimable space) less than one allocation group in size, the previous version data stored in the blocks associated with the record (i.e., the destination blocks in the data space to which the metadata record points) is copied to a temporary location not in the data space (1642). The amount of additional reclaimable space freed by moving the previous version data is added to the previous total (1644). Additional successive records are moved (1646 and 1648) until the total reclaimable space comprises at least one allocation group (1646), after which the block map associated with the restore point is updated (1650), so that the block map points to the temporary location to which the previous version data in moved records have been moved, with the result that such data would be read from the temporary location(s) if a user initiated a restore to a state associated with the restore point. Once the block map has been updated (1650), the reclaimable space in the data region, now comprising at least one allocation group, is reclaimed (1652), after which the process ends. In some alternative embodiments, the process of FIG. 16B is run in parallel with generation of a block map (list of destination blocks in which previous version data associated with a restore point is stored) and corresponding map or list of locked metadata records for a restore point that has been requested to be mounted; i.e., total reclaimable contiguous space available is tracked and previous version data are moved, if needed, on a write by write basis, as the block map is built, until a range of reclaimable space that comprises at least one allocation group has been made available. In such embodiments, 1650 is omitted because the block map as generated reflects the temporary location(s), if any, to which some/all of the previous version data associated with the restore point has been moved.

In some embodiments, the process of FIG. 16B is executed if a restore point has been mounted for longer than a prescribed, and in some embodiments configurable/tunable, period, even if the system is configured to initially skip over gap less than one allocation group in size and/or gaps associated with a restore point that includes one or more (or in some embodiments only) gaps less than one allocation group in size.

Figure 17:
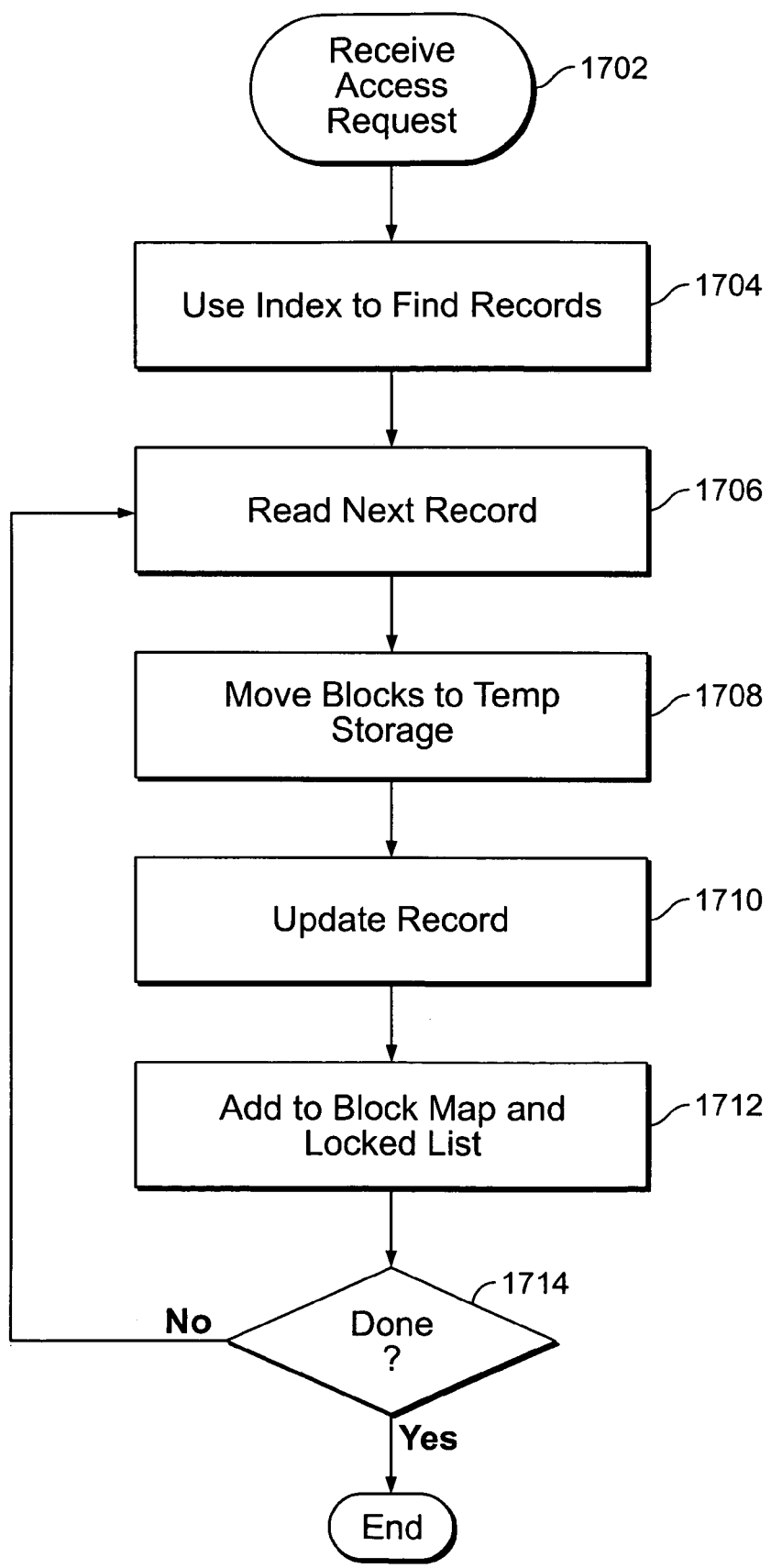
FIG. 17 is a flow chart illustrating an embodiment of a process for mounting a restore point.

FIG. 17 is a flow chart illustrating an embodiment of a process for mounting a restore point. In some embodiments, the process of FIG. 17 is used as an alternative to the processes of FIGS. 16A and 16B. In the example shown, previous version data associated with a restore point is moved to temporary storage during the course of mounting the restore point. This approach makes it possible to allow a restore point to remain mounted indefinitely, so long as it does not become necessary to reclaim and reuse, e.g., for a more recently mounted restore point, the temporary storage locations to which the previous version data associated with the restore point has been moved. In the example shown, a request to access (or preserve beyond a protection window) previous version data associated with a restore point, e.g., previous version data representing the state of a protected entity or a specified portion thereof (e.g., a range of source blocks), is received (1702). An index (e.g., one with time and source block keys, as described above) is used to identify the metadata records that point to the destination blocks in which previous version data associated with the restore point are stored (1704). In some embodiments, the records are identified in a list or other data structure that maps ranges of source blocks to corresponding metadata record identifiers, the identifiers in some embodiments including data indicating a storage device and location in which the corresponding metadata record is stored. Starting with a first record in the list, successive metadata records are read (1706). In some embodiments, each metadata record represents a write by a journaling process to the data space and includes an identification of the source blocks to which the corresponding previous version data were written at the protected entity, the destination blocks to which the data was written in the data space, and a timestamp indicating the time at which the data was written to the data space (or, alternatively, at the protected entity). As each record is read, or in some embodiments in batches once a prescribed number have been read, the corresponding previous version data is copied from the destination blocks identified in the record to a temporary location, e.g., one not in the data space (1708), the metadata record is updated to point to the temporary location as the destination to which the associated previous version data has been written (1710), and the blocks (as applicable) are added to the block map (with the destination for each block indicated as the temporary location to which the previous version data for that block has been moved) and the metadata record (which has been updated to point to the temporary location(s)) is added to the list of records that are locked because they are associated with the restore point (1712). Once all records associated with the restore point have been processed (1706-1714), the process ends.

In an environment in which multiple restore points may be mounted at the same time, the locked writes associated with two or more restore points may overlap in the data space, for example if one or more writes are associated with two or more restore points. An example of such an occurrence is the case of a write to a block that was not changed (i.e., not written to again) at the protected entity during the interval between a first time t1 associated with a first restore point and a later time t2 associated with a second, later restore point. In such an embodiment, there is a need for a way to effectively lock records associated with one or more restore points, and to safely un-mount a restore point without inadvertently unlocking a record that should remain locked because it is also associated with one or more other restore points that remain mounted. In some embodiments, cooperative locking is achieved by creating for each restore point a separate map, list, or other identification of metadata records associated with the restore point. Each metadata record map or list includes for each locked record a record identifier (comprising, e.g., a physical storage device on which the metadata record is stored and a location on that device at which the metadata record is stored) and a time associated with the record, e.g., a time at which the corresponding previous version data was written to the data space (or alternatively at the protected entity). Each map or list is sorted by time to generate a list of locked records (writes) in temporal order. At un-mounting, as described below, the space associated only with those records that appear only in the map or list associated with the restore point being un-mounted, and not those locations associated with any restore point that remains mounted, is reclaimed, and just the map or list associated with the restore point being un-mounted is deleted. In this way, records can be locked cooperatively for any number of restore points without requiring any locking mechanism to be implemented and updated with respect to the metadata records themselves or the associated storage locations in data space.

Figure 18A:
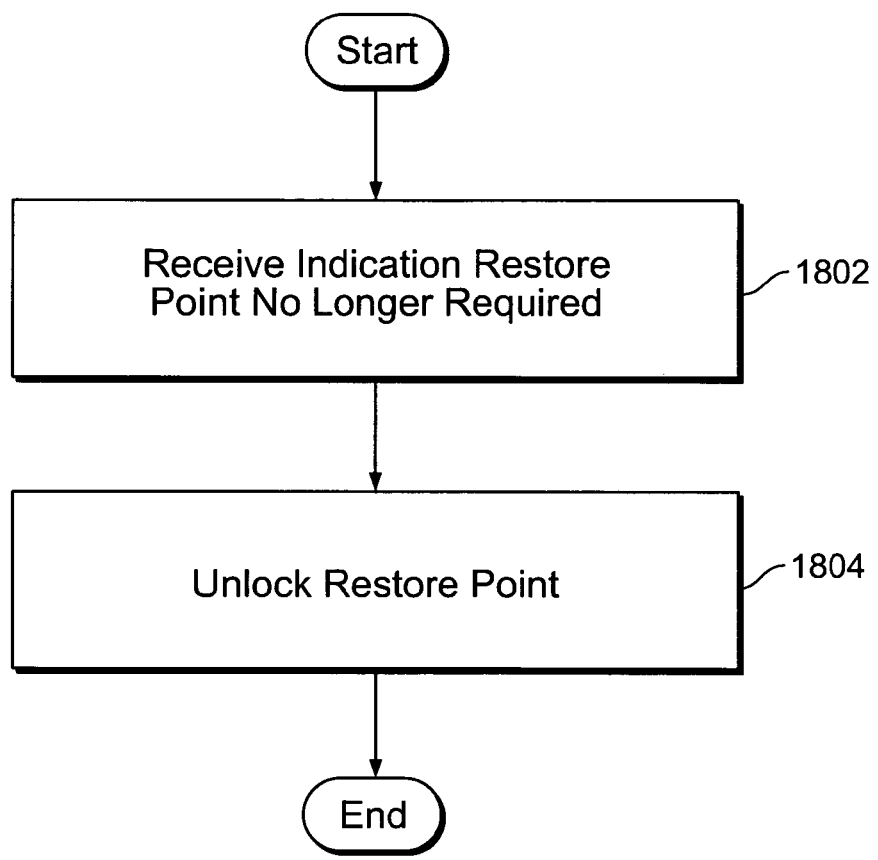
FIG. 18A is a flow chart illustrating an embodiment of a process for un-mounting a restore point.

FIG. 18A is a flow chart illustrating an embodiment of a process for un-mounting a restore point. In the example shown, an indication is received that a restore point is no longer required (1802), after which the storage locations (writes) associated with just that restore point, and not other restore points that remain mounted, are unlocked (1804).

Figure 18B:
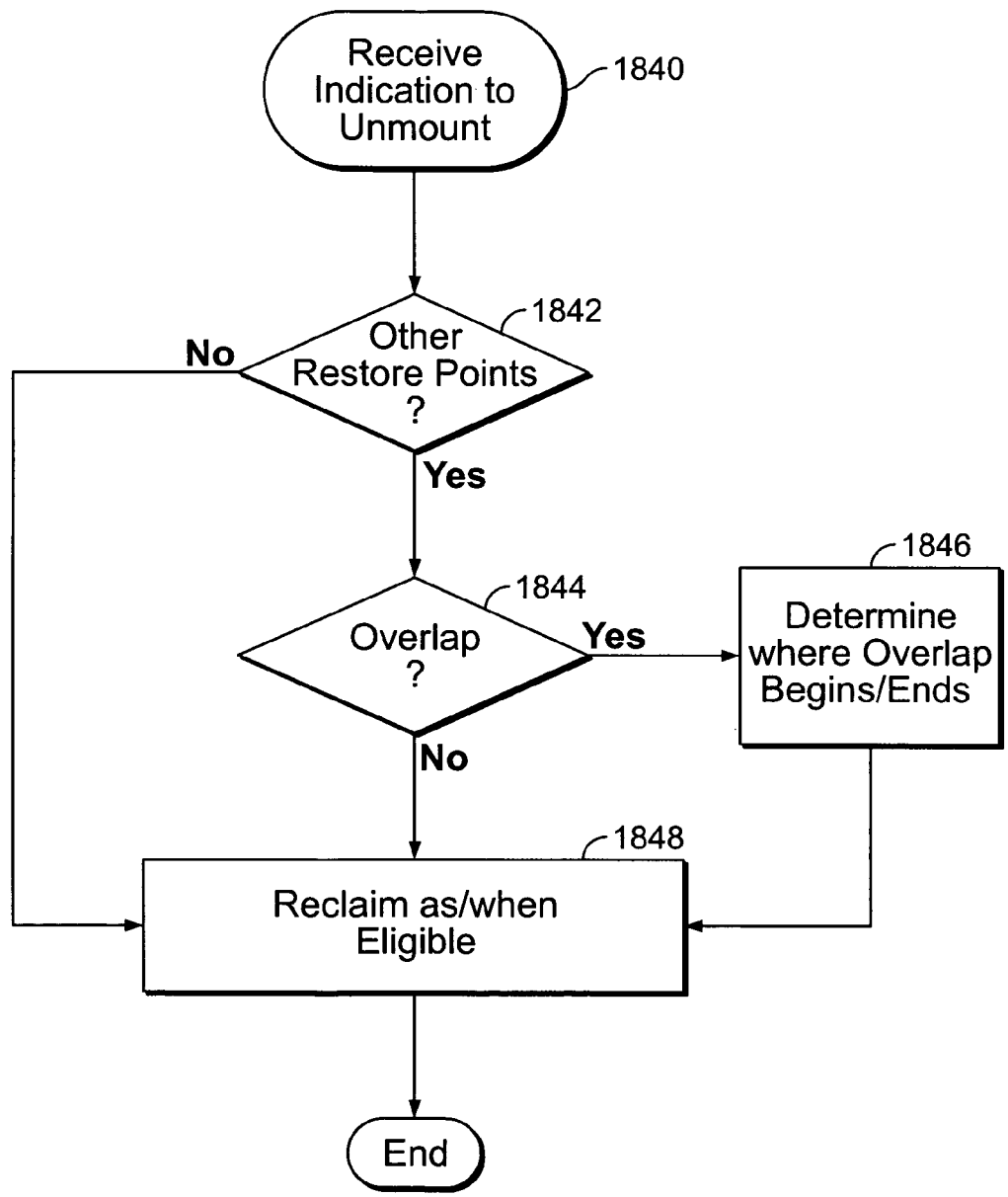
FIG. 18B is a flow chart illustrating an embodiment of a process for un-locking storage locations associated with a restore point that is being un-mounted.

FIG. 18B is a flow chart illustrating an embodiment of a process for un-locking storage locations associated with a restore point that is being un-mounted. In some embodiments, the process of FIG. 18B is used to implement 1804 of FIG. 18A. In the example shown, an indication to un-mount a restore point is received (1840). It is determined whether other restore points remain mounted (1842). In some embodiments, 1842 includes determining whether a locked metadata record map or list exists for any restore point(s) other than the restore point being un-mounted. If no other restore points exist (1842), the locked record map or list for the restore point is deleted and associated storage locations in data space are reclaimed as/when eligible (1848), as determined for example by the position of a virtual reclamation pointer relative to the respective locations. If it is determined that one or more other restore points exist, it is determined whether any restore point(s) that remain(s) mounted overlaps (i.e., has locked metadata records/writes in common with) the restore point being un-mounted (1844). If there is no overlap, the locked metadata record map or list associated with the restore point being un-mounted is deleted and the associated storage locations in data space are reclaimed (1848). If there is overlap (1844), it is determined where the overlap begins or ends (1846), as applicable depending on whether the restore point to remain mounted precedes or follows the restore point being un-mounted, and space is reclaimed only up to (or beginning at, as applicable) the point at which overlap begins (or ends, as applicable) (1848). In some embodiments, whether overlap exists (1844) is determined by comparing a last time associated with a last locked metadata record in a time-sorted list of metadata records associated with a first restore point with a first time associated with a first locked metadata record in a time-sorted list of metadata records associated with a second restore point and concluding there is overlap if the last time is later than the first time. In some embodiments, a point at which overlap begins (first restore point being un-mounted) is determined (1846) by comparing the respective times associated with successive locked metadata records associated with the first restore point, in time order, with the first time associated with the first record associated with the second restore point, until a record associated with the first restore point is found that has a time associated with it that is equal to or later than the first time. In some embodiments, a point at which overlap ends (second restore point being un-mounted) is determined (1846) by comparing the respective times associated with successive locked metadata records associated with the second restore point, in time order, with the last time associated with the last record associated with the first restore point, until a record associated with the second restore point is found that has a time associated with it that is later than the last time. Records up to the point of overlap (earlier restore point being un-mounted) or starting from the point of overlap (later restore point being un-mounted) are then reclaimed.

Figure 19:
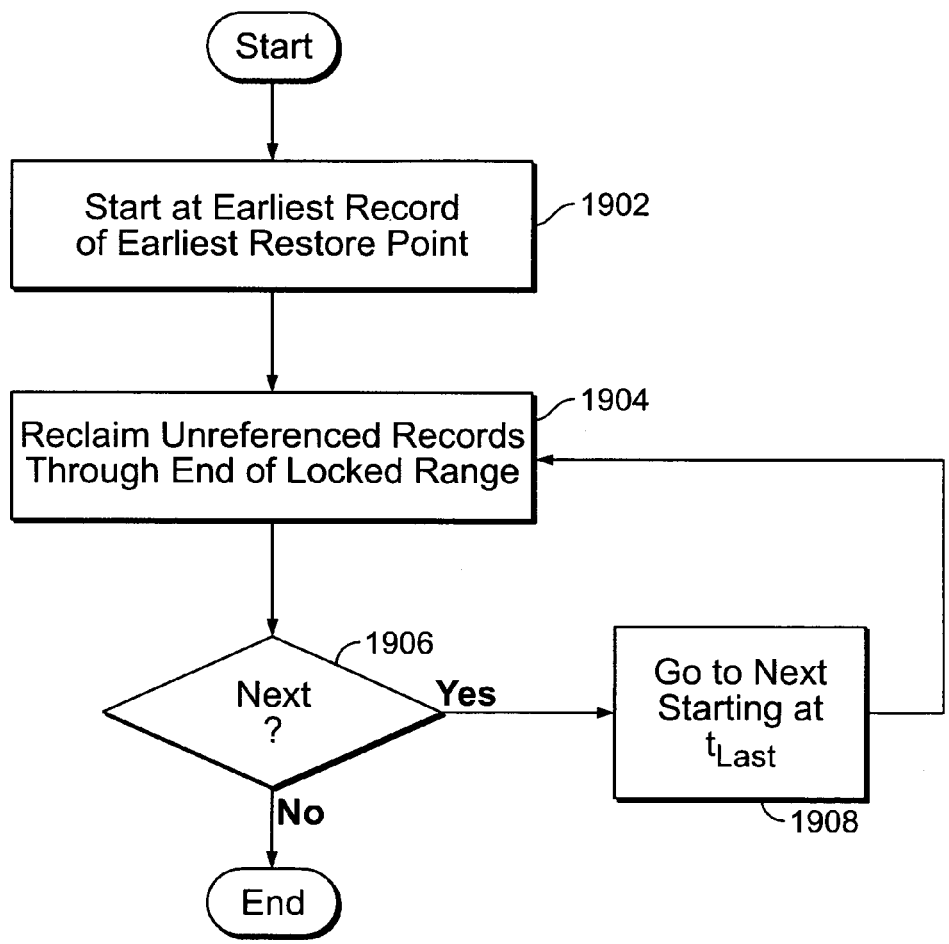
FIG. 19 is a flow chart illustrating an embodiment of a process for reclaiming unreferenced records in an environment in which multiple and potentially overlapping restore points may be mounted at the same time.

FIG. 19 is a flow chart illustrating an embodiment of a process for reclaiming unreferenced records in an environment in which multiple and potentially overlapping restore points may be mounted at the same time. Reclamation starts at an earliest (in time) record of an earliest mounted restore point (1902). Unreferenced records in the range of locked records (writes) associated with the restore point are reclaimed, through the end of the locked range (1904). In some embodiments, a record is considered to be unreferenced if it does not appear in any map or list of locked records associated with any restore point. For subsequent restore points (1906), reclamation begins at a last time associated with a last record in the locked range of records associated with the previous restore point (1908), and unreferenced records through the end of the range of locked records associated with that restore point are reclaimed (1904), until all restore points have been processed. In some embodiments, if unreferenced records make up less than one allocation group of contiguous space, the compaction/defragmentation techniques described above are used as needed to create contiguous ranges of reclaimable space comprising at least one allocation group.

In an embodiment in which previous version data associated with a mounted restore point is preserved by including associated metadata records in a map or list of records required to be retained, the storage locations in data space that are prevented from being reclaimed may include blocks that do not contain previous version data associated with the restore point and so do not appear in the block map generated for and associated with the restore point. This would occur, for example, if a write to the data space by a journaling process included both data written at the protected entity to blocks included in the restore point and data written to blocks not associated with the restore point, or if a write included data written to both blocks that were not subsequently overwritten prior to a time with which the restore point is associated and to one or more blocks that were overwritten subsequently but prior to the restore point time.

Figure 20A:
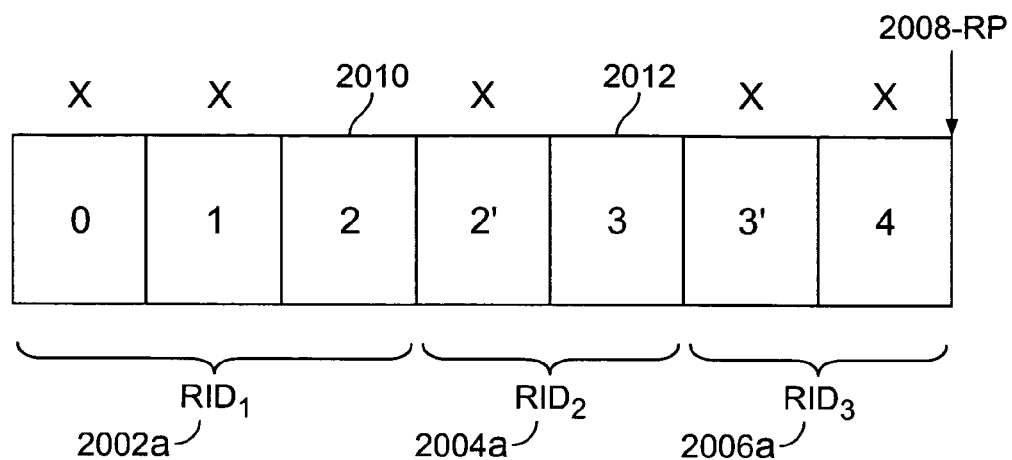
FIGS. 20A and 20B are block diagrams illustrating modifying metadata records to reclaim a portion of the blocks associated with a write to data space.
Figure 20B:
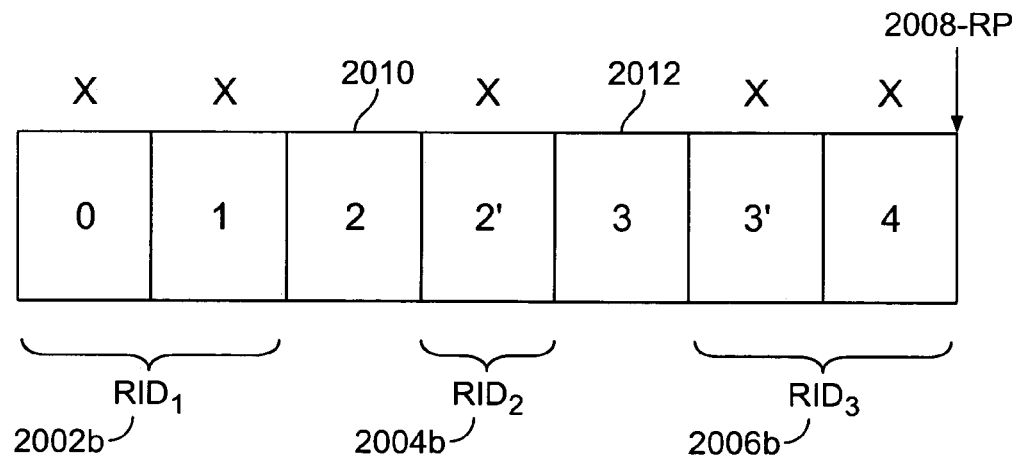

FIGS. 20A and 20B are block diagrams illustrating modifying metadata records to reclaim a portion of the blocks associated with a write to data space. In the example shown, three records 2002a, 2004a, and 2006a, have been locked because corresponding destination blocks contain previous version data associated with a mounted restore point 2008. The destination blocks containing previous version data are indicated in FIGS. 20A and 20B by an "x" above each respective destination block included in the restore point. In some embodiments, a block map generated and returned in response to a request to mount the restore point 2008 would list only those data space blocks that are marked by an "x". However, the locking mechanism disclosed herein, and any other mechanism that relies on locking metadata records to preserve associated previous version data, would result in blocks 2010 and 2012, which do not contain previous version data associated with the restore point, also being locked and, as a result, not reclaimed while the restore point remains mounted. In the example shown, only a few blocks that do not contain previous version data associated with the restore point are locked, but in environments in which data changes rapidly and large writes occur, the blocks that are locked but not required for the restore point may comprise a substantial amount of space. In some embodiments, as in the example shown in FIGS. 20A and 20B, locked metadata records may be rewritten to reference only destination blocks that contain previous version data associated with a restore point. In the example shown in FIG. 20B, the metadata records associated with record identifiers "RID1" and "RID2" have been rewritten to point only to blocks that contain previous version data associated with the restore point, i.e., the metadata record associated with RID1 no longer points to block 2010, even though that record is associated with a write to the data space that include a write to block 2010, and likewise the metadata record associated with RID2 no longer points to block 2012. The metadata record associated with RID3, which in this example from the beginning happened to point only to destination blocks containing previous version data associated with the restore point, was not rewritten. In various embodiments, the techniques described above for consolidating/defragmenting reclaimable space may be applied to blocks made available for reclamation by rewriting locked metadata records to point only to blocks containing previous version data associated with a restore point. In some embodiments, the technique illustrated by FIGS. 20A and 20B is employed only if a virtual reclamation pointer has advanced past the time/write(s) associated with the affected metadata record(s).

Figure 21:
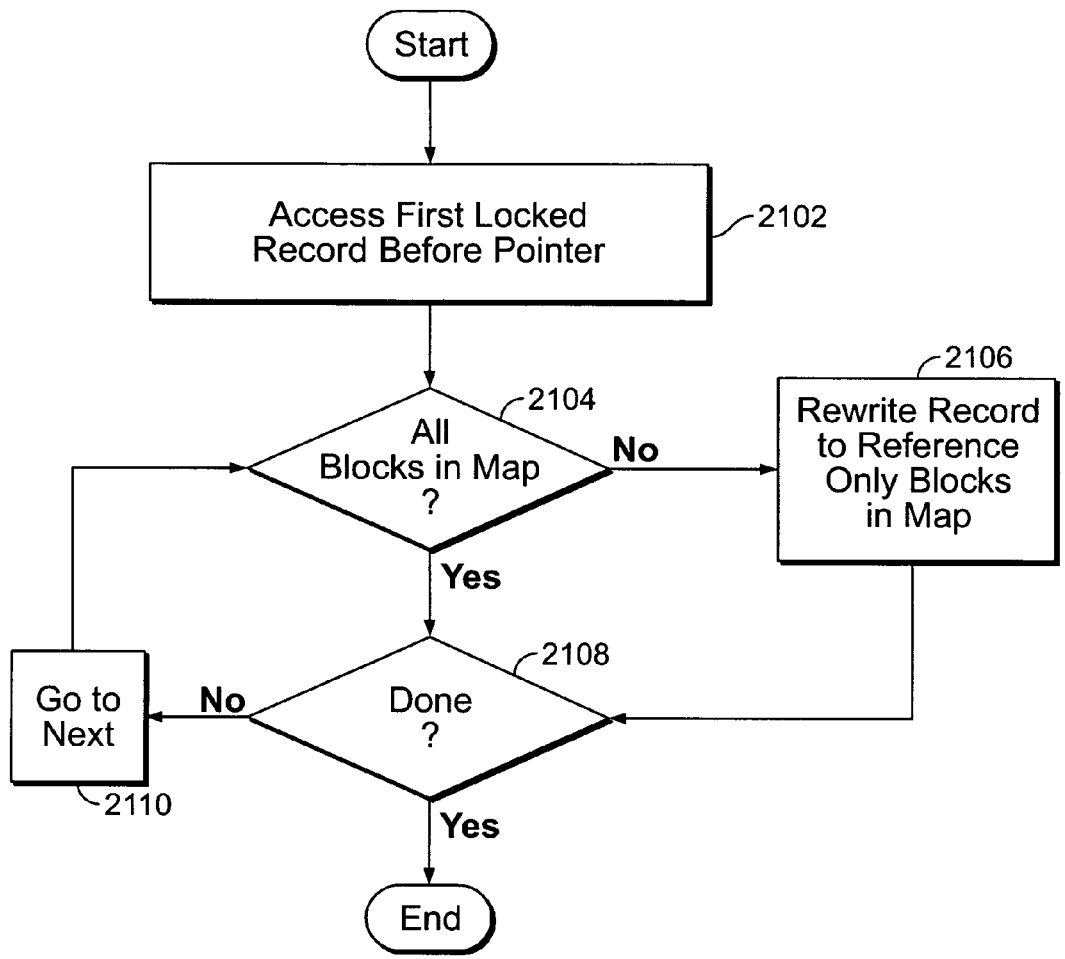
FIG. 21 is a flow chart illustrating an embodiment of a process for rewriting locked metadata records to reclaim space.

FIG. 21 is a flow chart illustrating an embodiment of a process for rewriting locked metadata records to reclaim space. In the example shown, a first (earliest) locked metadata record that is associated with a time that is earlier than a current position of a virtual reclamation pointer is accessed (2102). In some embodiments, a time-sorted map or list of locked metadata records associated with a restore point, e.g., an earliest or next one in time order of a plurality of saved restore points, is used to identify the first (and subsequent) locked record(s). It is determined whether all destination blocks to which the locked metadata record points contain previous version data associated with a restore point with which the locked record is associated (2104). In some embodiments, 2104 includes comparing a list of destination blocks identified in the locked record with a block map associated with the restore point. If not all destination blocks to which the locked metadata record point contain previous version data associated with the restore point (2104), the metadata record is rewritten to point only to destination blocks that appear in the block map associated with the restore point (2106). Otherwise, processing advances to a next locked record (2108 and 2110), and so on, until all locked metadata records associated with times earlier than a current position of the virtual reclamation pointer have been processed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of cooperatively locking storage, comprising:
   receiving an indication that a first set of previous version data associated with a first set of one or more writes to a data space by a journaling process configured to write to the data space previous version data comprising copies of writes to a protected entity is required to be retained;
   adding to a first set of stored metadata record identifiers associated with the first set of previous version data, for each of a corresponding first set of one or more metadata records associated with the first set of one or more writes, an identifier that identifies the metadata record as one associated with a write that is to be retained by virtue of being associated with the first set of previous version data;
   receiving an indication that a second set of previous version data associated with a second set of one or more writes to the data space by the journaling process is required to be retained; and
   adding to a second set of stored metadata record identifiers associated with the second set of previous version data, for each of a corresponding second set of one or more metadata records associated with the second set of one or more writes, an identifier that identifies the metadata record as one associated with a write that is to be retained by virtue of being associated with the second set of previous version data.

2. A method as recited in claim 1, wherein the first set of previous version data is associated with a first restore point and the second set of previous version data is associated with a second restore point.

3. A method as recited in claim 1, wherein for each write included in both the first set of one or more writes and the second set of one or more writes a corresponding metadata record identifier is included in both the first set of stored metadata record identifiers and the second set of stored metadata record identifiers.

4. A method as recited in claim 1, further comprising associating with each metadata record identifier an associated time.

5. A method as recited in claim 4, wherein the associated time comprises one or more of the following: a time at which a write with which the metadata record is associated was made at the protected entity; and a time at which a write with which the metadata record is associated was made by the journaling process to the data space.

6. A method as recited in claim 4, further comprising sorting the first set of metadata record identifiers by their respective associated times and sorting the second set of metadata record identifiers by their respective associated times.

7. A method as recited in claim 6, further comprising determining at least in part by comparing a last time associated with a last metadata record identifier in the time-sorted first set of metadata record identifiers and a first time associated with a first metadata record identifier in the time-sorted second set of metadata record identifiers whether the first set of previous version data and the second set of previous version data overlap.

8. A method as recited in claim 7, wherein it is determined that the first set of previous version data and the second set of previous version data overlap if the first time is earlier in time than the last time.

9. A method as recited in claim 8, further comprising determining a point at which the overlap begins, including by comparing the respective times associated with successive identifiers in the first set of metadata record identifiers, in time-sorted order starting with an identifier that has a time earlier than the first time, until an identifier that has associated with it a time that is later than or equal to the first time is found; and concluding that the overlaps begins at the identifier that has associated with it a time that is later than or equal to the first time.

10. A method as recited in claim 8, further comprising determining a point at which overlap ends, including by comparing the respective times associated with successive identifiers in the second set of metadata record identifiers, in time-sorted order starting with an identifier that has a time earlier than the last time, until an identifier that has associated with it a time that is later than or equal to the last time is found; and concluding that the overlaps ends at the identifier that has associated with it a time that is later than or equal to the last time.

11. A method as recited in claim 1, further comprising receiving an indication that one or the other of the first set of previous version data and the second set of previous version data is no longer required to be retained; and making available for reclamation and reallocation to the journaling process those storage locations associated with metadata records the respective identifiers of which are included in the first set of metadata record identifiers but not in the second set of metadata record identifiers.

12. A method as recited in claim 11, further comprising deleting the first set of metadata record identifiers.

13. A system configured to cooperatively lock storage, comprising:
   a storage comprising a data space; and
   a processor coupled to the storage and configured to:
      receive an indication that a first set of previous version data associated with a first set of one or more writes to the data space by a journaling process configured to write to the data space previous version data comprising copies of writes to a protected entity is required to be retained;
      add to a first set of stored metadata record identifiers associated with the first set of previous version data, for each of a corresponding first set of one or more metadata records associated with the first set of one or more writes, an identifier that identifies the metadata record as one associated with a write that is to be retained by virtue of being associated with the first set of previous version data;
      receive an indication that a second set of previous version data associated with a second set of one or more writes to the data space by the journaling process is required to be retained; and
      add to a second set of stored metadata record identifiers associated with the second set of previous version data, for each of a corresponding second set of one or more metadata records associated with the second set of one or more writes, an identifier that identifies the metadata record as one associated with a write that is to be retained by virtue of being associated with the second set of previous version data.

14. A system as recited in claim 13, wherein the first set of previous version data is associated with a first restore point and the second set of previous version data is associated with a second restore point.

15. A system as recited in claim 13, wherein the first and second sets of metadata are stored in the storage.

16. A system as recited in claim 13, wherein for each write included in both the first set of one or more writes and the second set of one or more writes a corresponding metadata record identifier is included in both the first set of stored metadata record identifiers and the second set of stored metadata record identifiers.

17. A system as recited in claim 13, wherein the processor is further configured to associate with each metadata record identifier an associated time.

18. A computer program product for cooperative locking storage, the computer program product being embodied in a computer readable medium and comprising computer instructions for:
   receiving an indication that a first set of previous version data associated with a first set of one or more writes to a data space by a journaling process configured to write to the data space previous version data comprising copies of writes to a protected entity is required to be retained;
   adding to a first set of stored metadata record identifiers associated with the first set of previous version data, for each of a corresponding first set of one or more metadata records associated with the first set of one or more writes, an identifier that identifies the metadata record as one associated with a write that is to be retained by virtue of being associated with the first set of previous version data;
   receiving an indication that a second set of previous version data associated with a second set of one or more writes to the data space by the journaling process is required to be retained; and
   adding to a second set of stored metadata record identifiers associated with the second set of previous version data, for each of a corresponding second set of one or more metadata records associated with the second set of one or more writes, an identifier that identifies the metadata record as one associated with a write that is to be retained by virtue of being associated with the second set of previous version data.

19. A computer program product as recited in claim 18, wherein the first set of previous version data is associated with a first restore point and the second set of previous version data is associated with a second restore point.

20. A computer program product as recited in claim 18, wherein for each write included in both the first set of one or more writes and the second set of one or more writes a corresponding metadata record identifier is included in both the first set of stored metadata record identifiers and the second set of stored metadata record identifiers.

* * * * *